(12) United States Patent
Kobayashi et al.

(10) Patent No.: US 10,819,900 B2
(45) Date of Patent: Oct. 27, 2020

(54) IMAGING ELEMENT AND IMAGING APPARATUS

(71) Applicant: FUJIFILM Corporation, Tokyo (JP)

(72) Inventors: Makoto Kobayashi, Saitama (JP); Tomoyuki Kawai, Saitama (JP); Seiji Tanaka, Saitama (JP); Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/509,826

(22) Filed: Jul. 12, 2019

(65) Prior Publication Data
US 2019/0335110 A1 Oct. 31, 2019

Related U.S. Application Data

(63) Continuation of application No. PCT/JP2018/008354, filed on Mar. 5, 2018.

(30) Foreign Application Priority Data

Mar. 16, 2017 (JP) .................................. 2017-051519

(51) Int. Cl.
*H04N 5/232* (2006.01)
*H04N 9/04* (2006.01)

(52) U.S. Cl.
CPC ... *H04N 5/232122* (2018.08); *H04N 5/23245* (2013.01); *H04N 9/0455* (2018.08)

(58) Field of Classification Search
CPC ............................................... H04N 5/232122
See application file for complete search history.

(56) References Cited

U.S. PATENT DOCUMENTS

2011/0317042 A1 12/2011 Goto
2012/0176520 A1 7/2012 Hara
(Continued)

FOREIGN PATENT DOCUMENTS

JP 2012-8424 A 1/2012
JP 2014-147141 A 8/2012
(Continued)

OTHER PUBLICATIONS

International Preliminary Report on Patentability (Form PCT/IPEA/409) for International Application No. PCT/JP2018/008354, dated Feb. 7, 2019, with English translation.
(Continued)

*Primary Examiner* — Cynthia Segura
(74) *Attorney, Agent, or Firm* — Birch, Stewart, Kolasch & Birch, LLP

(57) ABSTRACT

In an imaging element in which a plurality of phase difference detection pixels and a plurality of normal pixels for imaging are two-dimensionally arranged in a horizontal direction and a vertical direction, the phase difference detection pixel includes a first phase difference pixel ZA and a second phase difference pixel ZB including opening portions for pupil separation at different positions in the horizontal direction. The first phase difference pixel ZA and the second phase difference pixel ZB are adjacently arranged to have the opening portions facing each other. RGB color filters are arranged in the plurality of normal pixels in the Bayer arrangement. The imaging element includes a normal pixel row in which only the normal pixel is arranged in the horizontal direction and a phase difference pixel row in which the first phase difference pixel ZA, the second phase difference pixel ZB, and one normal pixel are periodically arranged in the horizontal direction.

11 Claims, 11 Drawing Sheets

(56) References Cited

U.S. PATENT DOCUMENTS

| | | | |
|---|---|---|---|
| 2013/0293736 A1* | 11/2013 | Kuwazoe | H04N 5/3765 348/222.1 |
| 2014/0049668 A1* | 2/2014 | Endo | H04N 5/23212 348/272 |
| 2014/0092220 A1 | 4/2014 | Kawamura et al. | |
| 2015/0156428 A1* | 6/2015 | Uchida | H04N 5/3696 348/294 |
| 2015/0229847 A1* | 8/2015 | Aoki | H04N 5/23293 348/333.05 |
| 2015/0244925 A1* | 8/2015 | Kawai | H04N 5/3696 348/349 |
| 2015/0264324 A1 | 9/2015 | Sugawara | |
| 2016/0014329 A1* | 1/2016 | Okigawa | H04N 5/23293 348/346 |
| 2016/0014354 A1 | 1/2016 | Fukuda | |
| 2017/0118398 A1* | 4/2017 | Sano | H04N 5/3696 |
| 2018/0115729 A1* | 4/2018 | Ise | H04N 9/04557 |
| 2019/0394408 A1* | 12/2019 | Tanaka | H04N 5/36961 |
| 2020/0007799 A1* | 1/2020 | Tanaka | H04N 5/232122 |

FOREIGN PATENT DOCUMENTS

| | | |
|---|---|---|
| JP | 2013-13006 A | 1/2013 |
| JP | 2013-187811 A | 9/2013 |
| WO | WO 2012/169318 A1 | 12/2012 |
| WO | WO 2014/091854 A1 | 6/2014 |

OTHER PUBLICATIONS

International Search Report and Written Opinion of the International Searching Authority (Forms PCT/ISA/210 and PCT/ISA/237) for International Application No. PCT/JP2018/008354, dated May 15, 2018, with English translation of the Search Report.

\* cited by examiner

FIG. 4
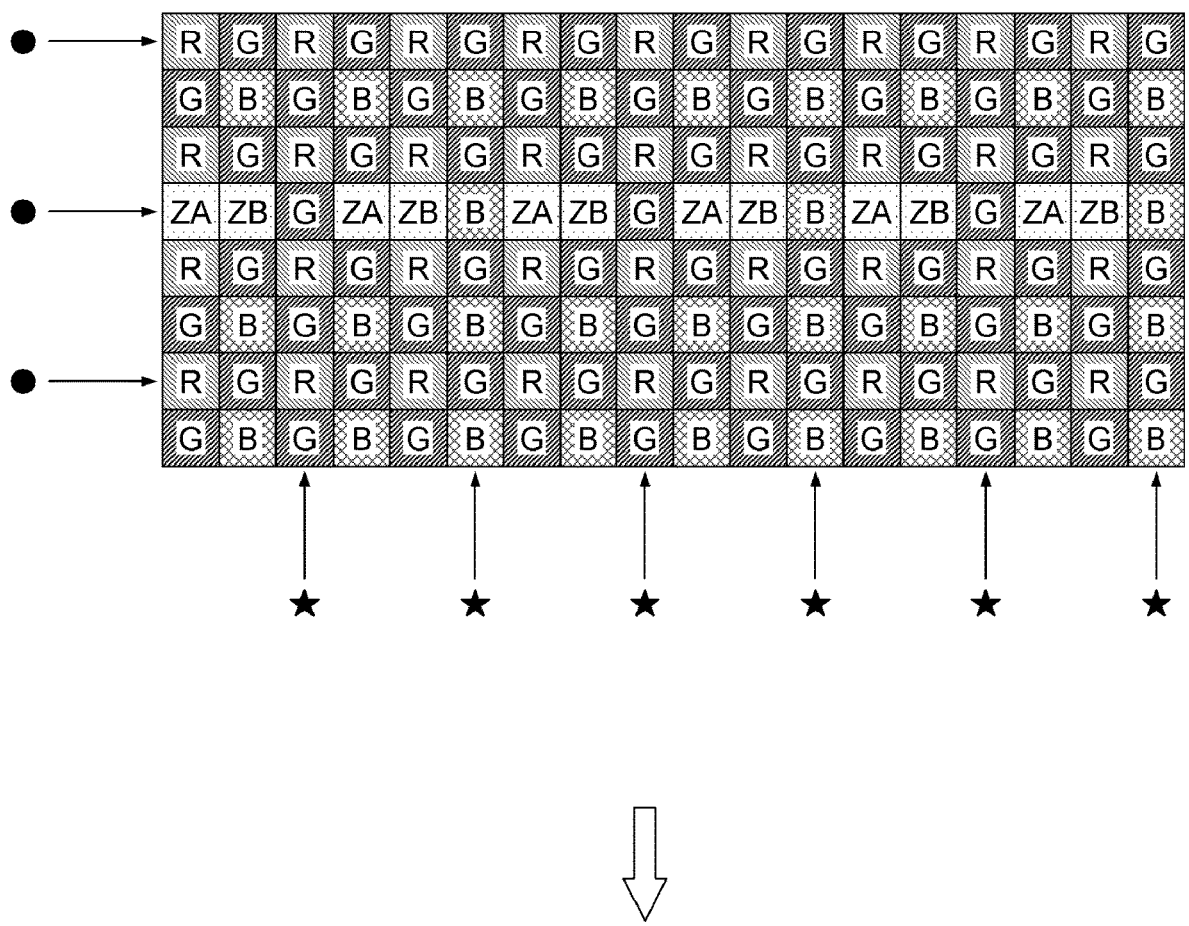
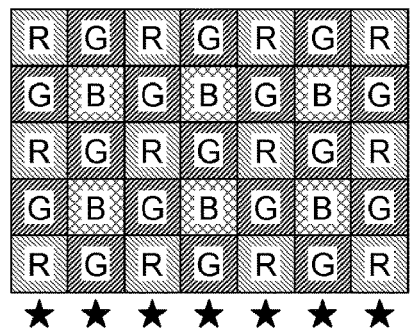

FIG. 5
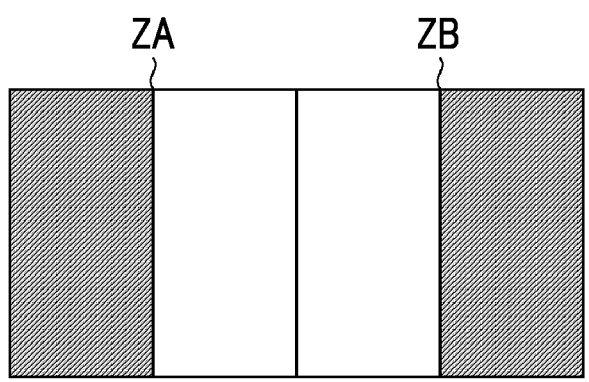
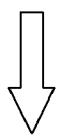
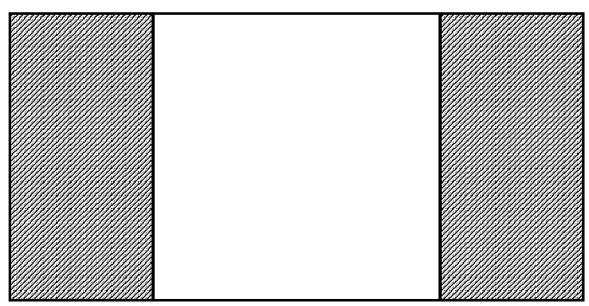

FIG. 10
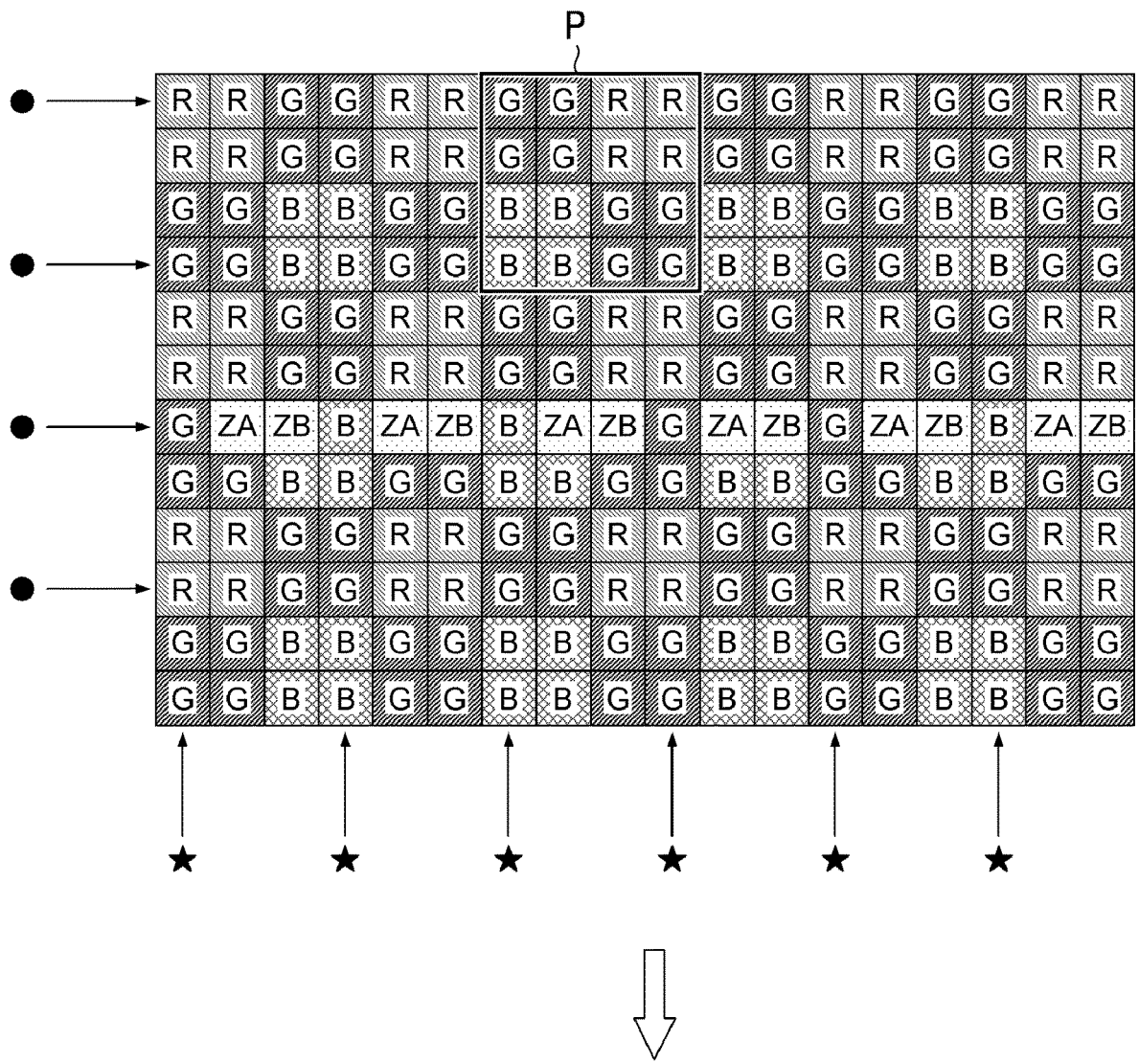
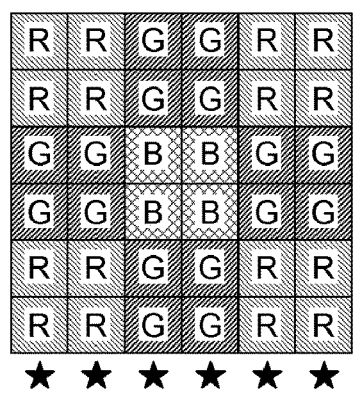

IMAGING ELEMENT AND IMAGING APPARATUS

CROSS-REFERENCE TO RELATED APPLICATIONS

The present application is a Continuation of PCT International Application No. PCT/JP2018/008354 filed on Mar. 5, 2018 claiming priority under 35 U.S.C. § 119(a) to Japanese Patent Application No. 2017-051519 filed on Mar. 16, 2017. Each of the above applications is hereby expressly incorporated by reference, in their entirety, into the present application.

BACKGROUND OF THE INVENTION

1. Field of the Invention

The present invention relates to an imaging element and an imaging apparatus and particularly, to an imaging element including a phase difference detection pixel and an imaging apparatus.

2. Description of the Related Art

Recently, a technology for arranging a first phase difference pixel and a second phase difference pixel having opening portions for pupil separation at different positions as a phase difference detection pixel in an imaging element and performing phase difference AF based on a phase difference between two image signals obtained from the first phase difference pixel and the second phase difference pixel has been widely used in order to increase the speed of autofocus (AF) (JP2013-013006A).

The imaging element disclosed in JP2013-013006A has color arrangement of color filters of red (R), green (G), and blue (B) corresponding to the Bayer arrangement. The first phase difference pixel and the second phase difference pixel are arranged instead of G pixels and B pixels in a specific GB row of the Bayer arrangement in which pixels (G pixels) including the G filter and pixels (B pixels) including the B filter are alternately arranged in the horizontal direction.

An imaging element disclosed in WO2012/169318 has color arrangement of color filters corresponding to Bayer arrangement in the same manner as the imaging element disclosed in JP2013-013006A. A phase difference detection pixel pair including the first phase difference pixel and the second phase difference pixel is disposed at discrete and periodic positions in a square grid. Of each pixel in the square grid, the first phase difference pixel is disposed at 2n+1 (n=1, 2, . . . ) intervals in the horizontal and vertical directions, and the second phase difference pixel is disposed as a pair with a pixel that is separated by two pixels from the first phase difference pixel and includes the color filter having the same color as the first phase difference pixel.

In the imaging element disclosed in WO2012/169318, a phase difference detection pixel pair of R pixels, a phase difference detection pixel pair of G pixels, and a phase difference detection pixel pair of B pixels are disposed as the phase difference detection pixel pair at discrete and periodic positions in the square grid. Thus, a first image including the first phase difference pixel and a second image including the second phase difference pixel are images having a disparity corresponding to the distance of a subject. That is, the imaging element disclosed in WO2012/169318 can capture a normal planar image and a solid image (two images including an image of only the first phase difference pixel and an image of only the second phase difference pixel).

SUMMARY OF THE INVENTION

In the imaging element disclosed in JP2013-013006A, the phase difference detection pixel (first and second phase difference pixels) is arranged at high density. Thus, AF performance is favorable, but a problem arises in that correction accuracy for the phase difference detection pixel is decreased.

The correction of the phase difference detection pixel is performed by "average value interpolation" in which interpolation is performed using the weighted average value of a plurality of normal pixels (pixels other than the phase difference detection pixel) present around the in-focus phase difference detection pixel. However, in the imaging element disclosed in JP2013-013006A, since the phase difference detection pixel is arranged at high density in the horizontal direction (lateral direction) of the imaging element, it is difficult to perform the average value interpolation (correction using the average value of normal pixels close in the horizontal direction to the phase difference detection pixel) in a case where the subject is a lateral line, thereby resulting in a problem of being unable to perform the average value interpolation with high accuracy.

Meanwhile, in the imaging element disclosed in WO2012/169318, in order to be able to capture the solid image, it is necessary to dispose each of the phase difference detection pixel pair of R pixels, the phase difference detection pixel pair of G pixels, and the phase difference detection pixel pair of B pixels at discrete and periodic positions in the square grid. Thus, the phase difference detection pixels of the pair in which the color filters having the same color are arranged are separated by two pixels from each other.

In the disclosure of WO2012/169318, the phase difference detection pixels of the pair in which the color filters having the same color are arranged are not used in the phase difference AF. In addition, while the phase difference detection pixel pair of R pixels, the phase difference detection pixel pair of G pixels, and the phase difference detection pixel pair of B pixels have a disparity in the horizontal direction (left-right direction) depending on the distance to the subject, the phase difference detection pixels of the pair in which the color filters having the same color are arranged are separated from each other by two pixels in the vertical direction. Thus, phase difference AF cannot be performed with high accuracy.

The present invention is conceived in view of such a matter. An object of the present invention is to provide an imaging element and an imaging apparatus having high correction accuracy for a phase difference detection pixel and favorable AF performance and furthermore, suitable for low power and high speed processing.

In order to achieve the object, the invention according to one aspect is an imaging element in which a plurality of phase difference detection pixels and a plurality of normal pixels for imaging are two-dimensionally arranged in a first direction and a second direction orthogonal to the first direction. The phase difference detection pixel includes a first phase difference pixel and a second phase difference pixel including opening portions for pupil separation at different positions in the first direction, and the first phase difference pixel and the second phase difference pixel are adjacently arranged to have the opening portions facing each other. In the plurality of normal pixels, a first filter corresponding to a first color most contributing to obtaining a brightness signal and a plurality of second filters respectively corresponding to two or more colors other than the first color are arranged in a first periodic color arrangement. The imaging element includes a normal pixel row in which only the normal pixel is arranged in the first direction and a phase difference pixel row in which the first phase difference pixel, the second phase difference pixel, and the normal pixel are periodically arranged in the first direction. Only the normal pixel row is arranged in at least two rows adjacent to the phase difference pixel row. In the phase difference pixel row, in a case where only the normal pixel extending in the second direction from a position at which the normal pixel is arranged is extracted, a color filter is arranged in the first periodic color arrangement in the extracted normal pixel.

According to one aspect of the present invention, the phase difference detection pixel (the first phase difference pixel and the second phase difference pixel) and the normal pixel are periodically arranged in the phase difference pixel row. Only the normal pixel is arranged in at least two rows adjacent to the phase difference pixel row. Thus, in the case of generating a pixel value at a pixel position of the phase difference detection pixel by interpolating a pixel value of a surrounding pixel, pixel values of the normal pixels of at least two rows adjacent to the phase difference pixel row and the pixel value of the normal pixel in the phase difference pixel row can be used. The phase difference detection pixel can be more accurately corrected (interpolated). In addition, in the phase difference pixel row, in a case where only the normal pixel extending in the second direction from a position at which the normal pixel is arranged is extracted, the color filter is arranged in the first periodic color arrangement in the extracted normal pixel. Thus, an image including the normal pixel having the first periodic color arrangement can be obtained, and low power and high speed processing are achieved. Furthermore, since a pair of the first phase difference pixel and the second phase difference pixel is adjacently arranged to have the opening portions facing each other, an interval between the pair of the first phase difference pixel and the second phase difference pixel is the minimum. Accordingly, a spatial sampling frequency of a phase difference can be maximized, and phase difference AF for a subject having a high spatial frequency can be performed more favorably (with higher accuracy) than that in a case where the pair of the first phase difference pixel and the second phase difference pixel is separately arranged with the normal pixel interposed therebetween.

An imaging apparatus according to another aspect of the present invention comprises an imaging element in which a plurality of phase difference detection pixels and a plurality of normal pixels for imaging are two-dimensionally arranged in a first direction and a second direction orthogonal to the first direction; the phase difference detection pixel includes a first phase difference pixel and a second phase difference pixel including opening portions for pupil separation at different positions in the first direction, and the first phase difference pixel and the second phase difference pixel are adjacently arranged to have the opening portions facing each other; in the plurality of normal pixels, a first filter corresponding to a first color most contributing to obtaining a brightness signal and a plurality of second filters respectively corresponding to two or more colors other than the first color are arranged in a first periodic color arrangement; the imaging element includes a normal pixel row in which only the normal pixel is arranged in the first direction and a phase difference pixel row in which the first phase difference pixel, the second phase difference pixel, and the normal pixel are periodically arranged in the first direction, only the normal pixel row is arranged in at least two rows adjacent to the phase difference pixel row, and in the phase difference pixel row; and in a case where only the normal pixel extending in the second direction from a position at which the normal pixel is arranged is extracted, a color filter is arranged in the first periodic color arrangement in the extracted normal pixel; an imaging optical system forming a subject image on a light-receiving surface of the imaging element; a phase difference detection unit that detects a phase difference between a first pixel value obtained from the first phase difference pixel and a second pixel value obtained from the second phase difference pixel of the phase difference pixel row of the imaging element; and an autofocus control unit that controls the imaging optical system based on the phase difference detected by the phase difference detection unit.

According to another aspect of the present invention, the subject image can be formed on the light-receiving surface of the imaging element (phase difference AF can be performed) by controlling the imaging optical system based on the phase difference between the first pixel value obtained from the first phase difference pixel of the phase difference pixel row of the imaging element and the second pixel value obtained from the second phase difference pixel. Particularly, since the first phase difference pixel and the second phase difference pixel of the imaging element are adjacently arranged to have the opening portions facing each other, and the interval between the pair of the first phase difference pixel and the second phase difference pixel is the minimum, the spatial sampling frequency of the phase difference can be maximized, and the phase difference AF for the subject having a high spatial frequency can be performed more accurately than in a case where the pair of the first phase difference pixel and the second phase difference pixel is separately arranged with the normal pixel interposed therebetween.

It is preferable that the imaging apparatus according to still another aspect of the present invention further comprises a mode switching unit that switches between a first mode for generating a first image and a second mode for generating a second image, a first image generation unit that generates pixel values at pixel positions of the first phase difference pixel and the second phase difference pixel of the phase difference pixel row based on at least a pixel value of the normal pixel of the phase difference pixel row and pixel values of the normal pixels of at least two normal pixel rows adjacent to the phase difference pixel row and generates the first image including the pixel values at the pixel positions of the first phase difference pixel and the second phase difference pixel in a case where the mode switching unit switches to the first mode, and a second image generation unit that extracts only the normal pixel extending in the second direction from a position at which the normal pixel is arranged in the phase difference pixel row, and generates the second image composed of pixel values of a plurality of the extracted normal pixels in a case where the mode switching unit switches to the second mode.

According to still another aspect of the present invention, in the case of switching to the first mode, the pixel values at the pixel positions of the first phase difference pixel and the second phase difference pixel of the phase difference pixel row can be generated based on at least the pixel value of the normal pixel of the phase difference pixel row and the pixel values of the normal pixels of at least two normal pixel rows adjacent to the phase difference pixel row, and the first image (first image of high resolution) including the pixel values at the pixel positions of the first phase difference pixel and the second phase difference pixel can be generated. In the case of switching to the second mode, the normal pixel extending in the second direction from the position at which the normal pixel is arranged in the phase difference pixel row can be extracted, and the second image (second image of low resolution) composed of the pixel values of the plurality of extracted normal pixels can be generated. The second image is composed of only the normal pixel, and the color filters are arranged in the first periodic color arrangement in the second image. Thus, it is not necessary to correct the phase difference detection pixel, and image processing of the first image and the second image in a subsequent stage can be implemented in common. Low power and high speed processing are achieved.

In the imaging apparatus according to still another aspect of the present invention, it is preferable that in a case where the first phase difference pixel and the second phase difference pixel are set as an in-focus pixel, the first image generation unit generates a pixel value at a pixel position of the in-focus pixel using a pixel value of a pixel around the pixel position of the in-focus pixel.

It is preferable that the imaging element according to still another aspect of the present invention further comprises a signal gradient calculation unit that calculates a signal gradient direction in which a signal gradient of the pixel around the pixel position of the in-focus pixel is the minimum in a case of setting the first phase difference pixel and the second phase difference pixel as the in-focus pixel and generating the pixel value at the pixel position of the in-focus pixel, in which the first image generation unit detects a plurality of pixels present in the signal gradient direction calculated by the signal gradient calculation unit with the pixel position of the in-focus pixel as a reference and having the same color as a color at the pixel position of the in-focus pixel and generates the pixel value at the pixel position of the in-focus pixel by interpolating pixel values of the plurality of detected pixels.

According to still another aspect of the present invention, a pixel used for interpolating the in-focus pixel in correspondence with the signal gradient direction of the surrounding pixel of the pixel position of the first phase difference pixel or the second phase difference pixel (in-focus pixel as a correction target) is selected. Thus, the correction accuracy of the phase difference pixel can be increased.

In the imaging apparatus according to still another aspect of the present invention, it is preferable that the signal gradient calculation unit calculates one of four directions including the first direction, the second direction and a third direction and a fourth direction between the first direction and the second direction as the signal gradient direction.

In the imaging apparatus according to still another aspect of the present invention, it is preferable that the signal gradient calculation unit calculates one of eight directions including four directions of the first direction, the second direction and a third direction and a fourth direction between the first direction and the second direction and four directions midway among the four directions as the signal gradient direction. By calculating the signal gradient direction using more detailed directions than four directions, the correction accuracy of the phase difference pixel can be further increased.

In the imaging apparatus according to still another aspect of the present invention, it is preferable that in a case where the signal gradient direction is not calculated by the signal gradient calculation unit, the first image generation unit generates the pixel value at the pixel position of the in-focus pixel based on a pixel value of a pixel closest to the pixel position of the in-focus pixel and having the same color as a color at the pixel position of the in-focus pixel, or pixel values of a plurality of pixels having the same color in an interpolation range with the pixel position of the in-focus pixel as a reference.

In the imaging apparatus according to still another aspect of the present invention, it is preferable that in each of the first phase difference pixel and the second phase difference pixel, the first filter is arranged, or light in a wavelength range wider than a transmission wavelength range of the first filter is incident, the imaging apparatus includes a pixel value addition unit that adds pixel values of the first phase difference pixel and the second phase difference pixel adjacently arranged to have the opening portions facing each other and generates an addition pixel value at a pixel position between the first phase difference pixel and the second phase difference pixel, and the first image generation unit uses the addition pixel value added by the pixel value addition unit as the pixel value of one of the surrounding pixels.

In a case where the pixel values of the pair of the first phase difference pixel and the second phase difference pixel adjacently arranged to have the opening portions facing each other are added, the pair of the first phase difference pixel and the second phase difference pixel behaves as if the normal pixel is present therebetween. The first image generation unit uses the addition pixel value as the pixel value of one of the surrounding pixels in the case of correcting the phase difference pixel. Thus, the correction accuracy of the phase difference detection pixel can be improved.

It is preferable that the imaging apparatus according to still another aspect of the present invention further comprises a gain interpolation information obtaining unit that sets the first phase difference pixel or the second phase difference pixel as the in-focus pixel and obtains gain interpolation information set for the pixel position of the in-focus pixel, in which the first image generation unit generates the pixel value at the pixel position of the in-focus pixel by gain interpolation based on a pixel value of the in-focus pixel and the gain interpolation information obtained by the gain interpolation information obtaining unit. Approximately half of the intensity of light incident on the surrounding normal pixel is incident on the first phase difference pixel and the second phase difference pixel. Thus, sensitivity is decreased below that of the normal pixel. The "gain interpolation" is an interpolation method of adjusting a signal level to that of the normal pixel by multiplying the pixel value of the phase difference detection pixel by the predetermined gain interpolation information in order to supplement the decrease in sensitivity of the phase difference detection pixel. In the case of correcting the phase difference detection pixel, depending on an imaging scene and the like, it may be more appropriate to perform the gain interpolation than average value interpolation that uses the surrounding pixel of the in-focus pixel. In that case, the "gain interpolation" is performed.

In the imaging element according to still another aspect of the present invention, it is preferable that the first periodic color arrangement is the Bayer arrangement, and the phase difference pixel row is periodically arranged with three pixels including a pair of the first phase difference pixel and the second phase difference pixel and one normal pixel as one cycle. In a case where the first periodic color arrangement is the Bayer arrangement, by reading the pixels of each row of the imaging element at a thinning-out rate of ⅓, only the normal pixel can be obtained. In the case of a mode in which reading is executed in a thinned-out manner, the correction process for the phase difference pixel is not necessary, and low power and high speed processing can be achieved.

In the imaging element according to still another aspect of the present invention, it is preferable that the first filter is a G filter transmitting light in a wavelength range of green, and the plurality of second filters include an R filter transmitting light in a wavelength range of red and a B filter transmitting light in a wavelength range of blue, the first periodic color arrangement has a basic arrangement pattern of 4×4 pixels adjacently arranged in the first direction and the second direction, in the basic arrangement pattern, 2×2 pixels including the G filter and 2×2 pixels including the R filter are adjacently arranged in the first direction, and 2×2 pixels including the B filter and 2×2 pixels including the G filter are adjacently arranged in the first direction, and the phase difference pixel row is periodically arranged with three pixels including a pair of the first phase difference pixel and the second phase difference pixel and one normal pixel as one cycle.

That is, the first periodic color arrangement is not limited to the Bayer arrangement and may be the above color arrangement having the basic arrangement pattern of 4×4 pixels. In this case, in the phase difference pixel row, by periodically arranging three pixels including the pair of the first phase difference pixel and the second phase difference pixel and one normal pixel as one cycle, only the normal pixel can be obtained by reading the pixels of each row of the imaging element at a thinning-out rate of ⅓. In the case of a mode in which reading is executed in a thinned-out manner, the correction process for the phase difference detection pixel is not necessary, and low power and high speed processing can be achieved.

According to the present invention, in the phase difference pixel row in which the phase difference detection pixel (the first phase difference pixel and the second phase difference pixel) and the normal pixel are periodically arranged in the first direction, the first phase difference pixel and the second phase difference pixel are adjacently arranged to have the opening portions facing each other. Thus, in the case of generating the pixel value at the pixel position of the phase difference detection pixel by interpolating the pixel value of the surrounding pixel, the pixel values of the normal pixels of at least two normal pixel rows adjacent to the phase difference pixel row and the pixel value of the normal pixel of the phase difference pixel can be used. The phase difference detection pixel can be accurately corrected. In addition, in the phase difference pixel row, in a case where only the normal pixel extending in the second direction from the position at which the normal pixel is arranged is extracted, the color filter is arranged in the first periodic color arrangement in the extracted normal pixel. Thus, an image including only the normal pixel having the first periodic color arrangement can be obtained, and low power and high speed processing are achieved. Furthermore, since the first phase difference pixel and the second phase difference pixel are adjacently arranged to have the opening portions facing each other, the phase difference AF can be performed more favorably than that in a case where the pair of the first phase difference pixel and the second phase difference pixel is separately arranged with the normal pixel interposed therebetween.

BRIEF DESCRIPTION OF THE DRAWINGS

FIG. 4 is a diagram illustrating a first embodiment of color filter arrangement and arrangement of phase difference detection pixels in an imaging element.

FIG. 5 is a plan view schematically illustrating a pair of a first phase difference pixel ZA and a second phase difference pixel ZB.

FIG. 8 is a diagram for describing average value interpolation for the phase difference detection pixels in the imaging element of the first embodiment.

FIG. 9 is another diagram for describing the average value interpolation for the phase difference detection pixels in the imaging element of the first embodiment.

FIG. 10 is a diagram illustrating a second embodiment of color filter arrangement and arrangement of phase difference detection pixels in an imaging element.

FIG. 11 is a diagram for describing the average value interpolation for the phase difference detection pixels in the imaging element of the second embodiment.

FIG. 12 is another diagram for describing the average value interpolation for the phase difference detection pixels in the imaging element of the second embodiment.

DESCRIPTION OF THE PREFERRED EMBODIMENTS

Hereinafter, preferred embodiments of an imaging element and an imaging apparatus according to the present invention will be described in accordance with the appended drawings.

[Imaging Apparatus]

Figure 1:
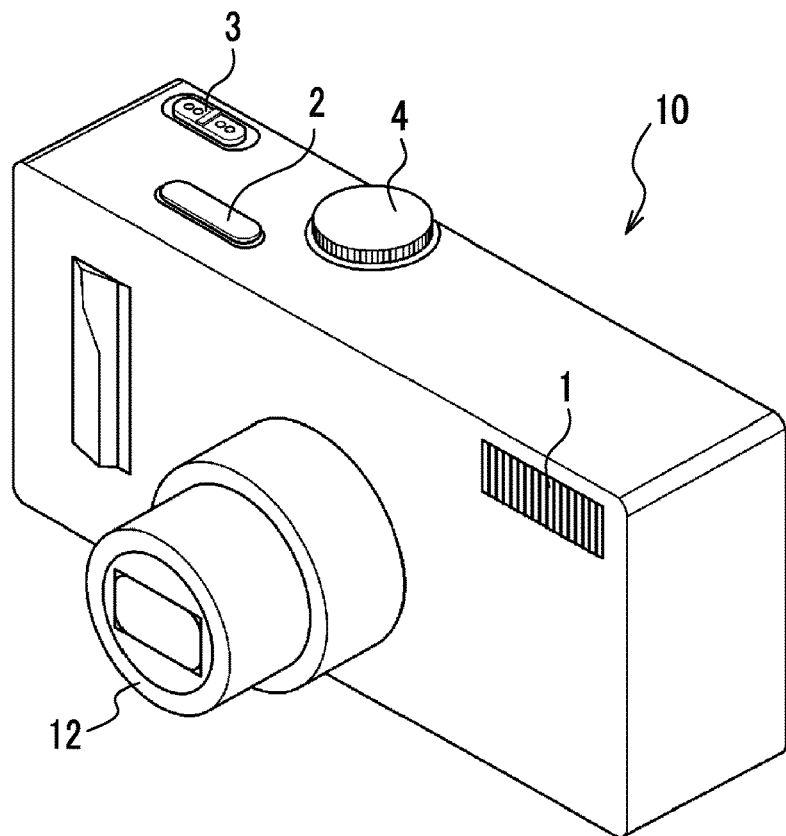
FIG. 1 is a perspective view illustrating one example of an imaging apparatus.
Figure 2:
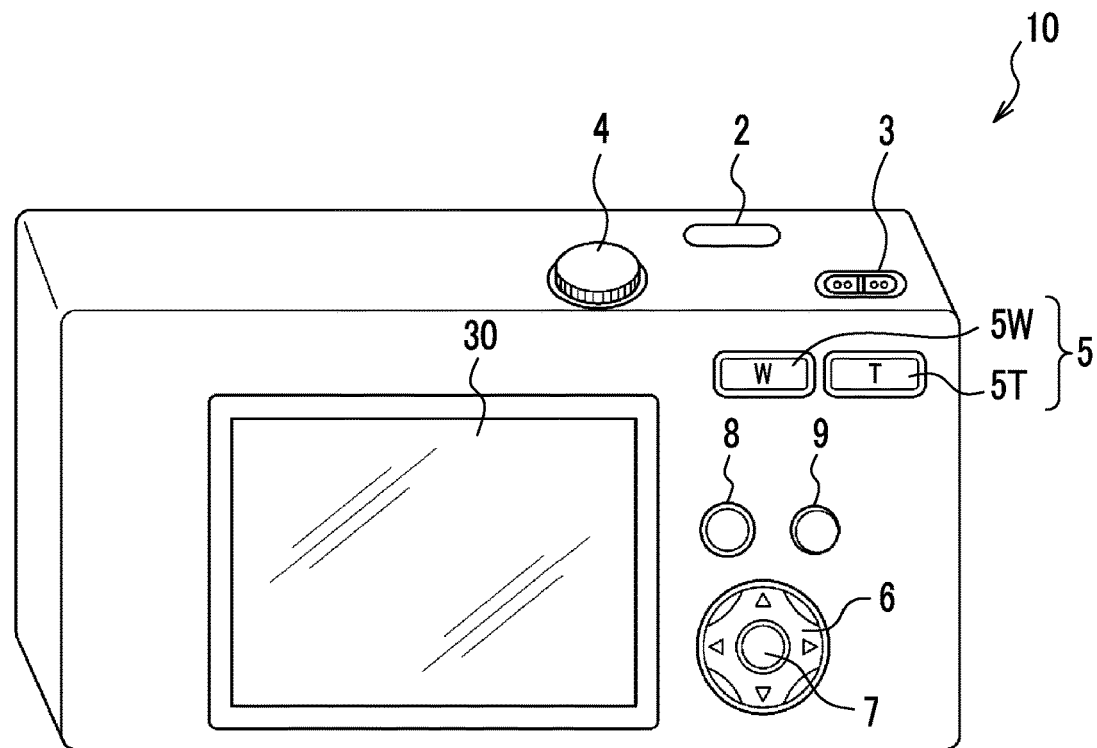
FIG. 2 is a rear view of the imaging apparatus illustrated in FIG. 1.

FIG. 1 and FIG. 2 are respectively a perspective view and a rear view illustrating one example (digital camera) of the imaging apparatus. An imaging apparatus 10 is a digital camera that receives light passing through a lens by an imaging element, converts the light into a digital signal, and records the digital signal in a recording medium as image data of a still picture or a motion picture.

As illustrated in FIG. 1, in the imaging apparatus 10, an imaging lens 12, a strobe 1, and the like are arranged on a front surface, and a shutter button 2, a power supply/mode switch 3, a mode dial 4, and the like are arranged on an upper surface. As illustrated in FIG. 2, a liquid crystal monitor (liquid crystal display (LCD)) 30, a zoom button 5, a cross button 6, a MENU/OK button 7, a playback button 8, a BACK button 9, and the like are arranged on the rear surface of the camera.

The imaging lens 12 is composed of a retractable zoom lens and is withdrawn from the main body of the camera by setting an operation mode of the camera to an imaging mode by the power supply/mode switch 3. The strobe 1 radiates strobe light to a main subject.

The shutter button 2 is composed of a so-called stroke type switch of two stages including "half push" and "full push" and functions as an imaging preparation instruction unit and also functions as an image recording instruction unit.

In a case where a still picture imaging mode is selected as the imaging mode and the shutter button 2 is subjected to the "half push", the imaging apparatus 10 performs an imaging preparation operation of performing autofocus (AF)/auto exposure (AE) control. In a case where the shutter button 2 is subjected to the "full push", the imaging apparatus 10 images and records a still picture.

In addition, in a case where a motion picture imaging mode is selected as the imaging mode and the shutter button 2 is subjected to the "full push", the imaging apparatus 10 starts recording a motion picture. In a case where the shutter button 2 is subjected to the "full push" again, the imaging apparatus 10 stops recording and enters a standby state.

The power supply/mode switch 3 functions as a power supply switch for switching a power supply of the imaging apparatus 10 ON/OFF and also functions as a mode switch for setting the mode of the imaging apparatus 10. The power supply/mode switch 3 is arranged to be slidable among an "OFF position", a "playback position", and an "imaging position". The power supply of the imaging apparatus 10 is switched ON by sliding the power supply/mode switch 3 to the "playback position" or the "imaging position". The power supply of the imaging apparatus 10 is switched OFF by sliding the power supply/mode switch 3 to the "OFF position". Sliding the power supply/mode switch 3 to the "playback position" sets a "playback mode". Sliding the power supply/mode switch 3 to the "imaging position" sets the "imaging mode".

The mode dial 4 functions as a mode switching unit that sets the imaging mode of the imaging apparatus 10. The imaging mode of the imaging apparatus 10 is set to various modes depending on a setting position of the mode dial 4. For example, various modes include the "still picture imaging mode" (first mode) for imaging a still picture and the "motion picture imaging mode" (second mode) for imaging a motion picture.

The liquid crystal monitor 30 displays a live view image at the time of the imaging mode and displays the still picture or the motion picture at the time of the playback mode. The liquid crystal monitor 30 also functions as a part of a graphical user interface by, for example, displaying a menu screen.

The zoom button 5 functions as zoom instruction means for providing a zoom instruction and includes a tele button 5T for providing a zoom instruction to a telephoto side and a wide button 5W for providing a zoom instruction to a wide angle side. In the imaging apparatus 10, operating the tele button 5T and the wide button 5W at the time of the imaging mode changes the focal length of the imaging lens 12. In addition, operating the tele button 5T and the wide button 5W at the time of the playback mode enlarges and shrinks the image in playback.

The cross button 6 is an operation unit that inputs instructions in four directions of upward, downward, leftward, and rightward directions and functions as a button (cursor movement operation means) for selecting an item from the menu screen or providing an instruction to select various setting items from each menu. A left/right key functions as a button (forward direction/backward direction forwarding) for frame forwarding at the time of the playback mode.

The MENU/OK button 7 is an operation button functioning as a menu button for providing an instruction to display the menu on a screen of the liquid crystal monitor 30 and also functioning as an OK button for providing an instruction to, for example, confirm and execute the content of selection.

The playback button 8 is a button for switching to the playback mode in which the imaged and recorded still picture or motion picture is displayed on the liquid crystal monitor 30.

The BACK button 9 functions as a button for providing an instruction to cancel an input operation and return to the immediately previous operation state.

In the imaging apparatus 10 according to the present embodiment, the functions of the buttons/switches may be implemented by disposing and operating a touch panel without disposing members specific to the buttons/switches.

[Internal Configuration of Imaging Apparatus]

Figure 3:
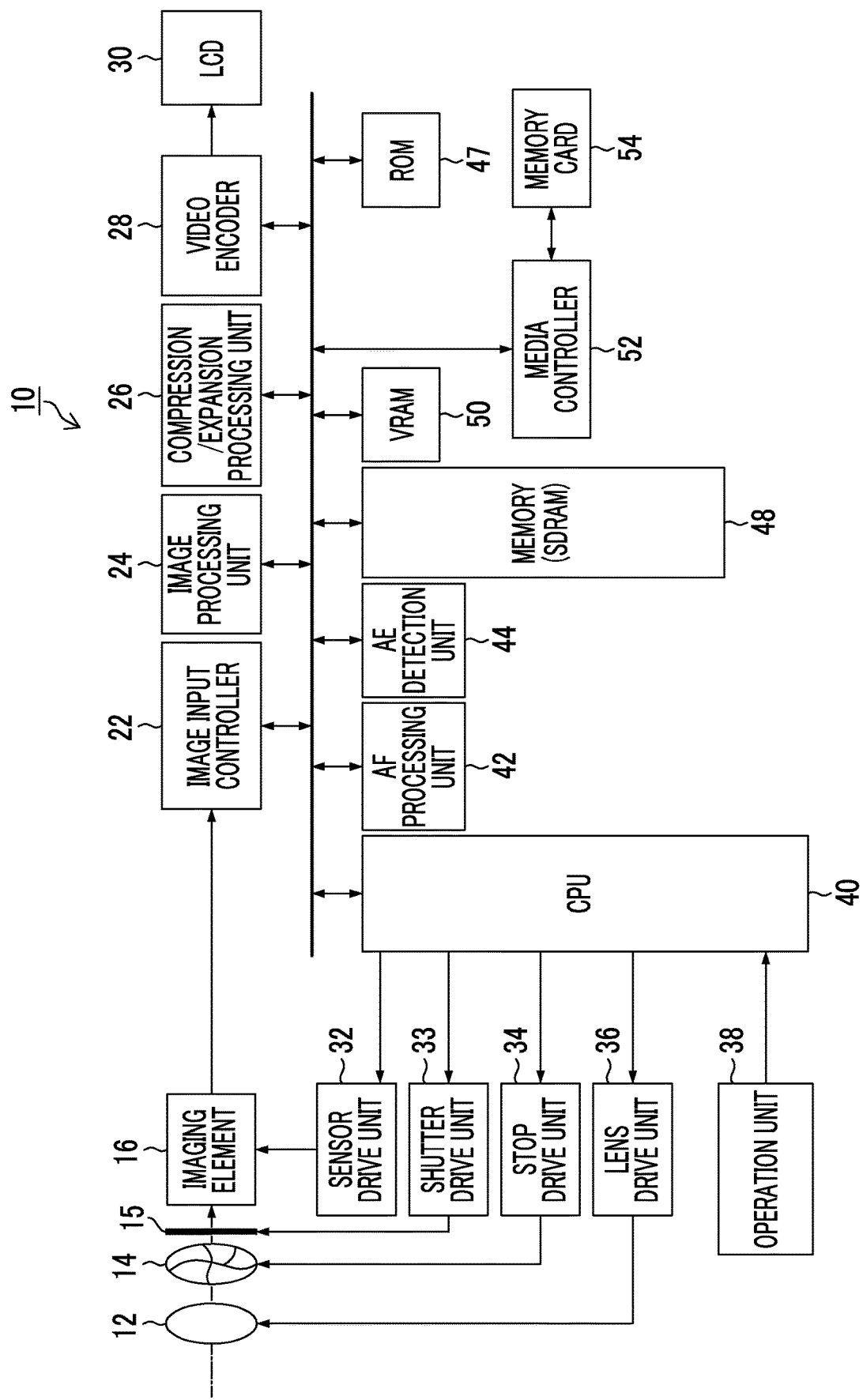
FIG. 3 is a block diagram illustrating one example of an internal configuration of the imaging apparatus illustrated in FIG. 1.

FIG. 3 is a block diagram illustrating an embodiment of an internal configuration of the imaging apparatus 10. The imaging apparatus 10 records the captured image in a memory card 54. The operation of the whole apparatus is managed and controlled by a central processing unit (CPU) 40.

An operation unit 38 such as the shutter button 2, the power supply/mode switch 3, the mode dial 4, the tele button 5T, the wide button 5W, the cross button 6, the MENU/OK button 7, the playback button 8, and the BACK button 9 is disposed in the imaging apparatus 10. A signal from the operation unit 38 is input into the CPU 40. The CPU 40 controls each circuit of the imaging apparatus 10 based on the input signal. For example, the CPU 40 performs drive control of the imaging element, lens drive control, stop drive control, imaging operation control, image processing control, recording/playback control of the image data, and display control of the liquid crystal monitor 30.

In a case where the power supply of the imaging apparatus 10 is switched ON by the power supply/mode switch 3, power is supplied to each block from a power supply unit, not illustrated, and the imaging apparatus 10 starts to be driven.

An image of a luminous flux passing through the imaging lens 12, a stop 14, a mechanical shutter 15, and the like is formed in an imaging element 16 that is a complementary metal-oxide semiconductor (CMOS) type color image sensor. The imaging element 16 is not limited to a CMOS type and may be a color image sensor of an XY address type or a charge coupled device (CCD) type.

In the imaging element 16, multiple light-receiving elements (photodiodes) are two-dimensionally arranged. A subject image formed on a light-receiving surface of each photodiode is converted into a signal voltage (or charge) of an amount corresponding to the intensity of an incidence ray. The signal voltage is converted into a digital signal through an analog/digital (A/D) converter in the imaging element 16 and is output.

First Embodiment of Imaging Element

In the imaging element 16, color filters are arranged in a first periodic color arrangement, illustrated below, on a plurality of pixels composed of photoelectric conversion elements (photodiodes) that are two-dimensionally arranged in a first direction (horizontal direction) and a second direction (vertical direction) orthogonal to the first direction. In addition, in the imaging element 16, a plurality of phase difference detection pixels and a plurality of normal pixels (pixels other than the phase difference detection pixel) for imaging are arranged.

As illustrated in FIG. 5, the phase difference detection pixel includes an opening portion for pupil separation and is composed of a first phase difference pixel ZA and a second phase difference pixel ZB having opening portions at different positions in the horizontal direction. A pair of the first phase difference pixel ZA and the second phase difference pixel ZB is adjacently arranged to have the opening portions facing each other. Details of the structures of the first phase difference pixel ZA and the second phase difference pixel ZB will be described below.

FIG. 4 is a diagram illustrating a first embodiment of color filter arrangement and arrangement of the phase difference detection pixels in the imaging element 16.

As illustrated in FIG. 4, a first filter corresponding to a first color (green) and any of a plurality of second filters respectively corresponding to two or more colors (red and blue) other than green are arranged in a first periodic color arrangement in the plurality of normal pixels of the imaging element 16. The first periodic color arrangement of the color filters of the imaging element 16 of the first embodiment is the general Bayer arrangement. The first filter is a G filter transmitting light in a wavelength range of green. The plurality of second filters include an R filter transmitting light in a wavelength range of red and a B filter transmitting light in a wavelength range of blue.

In the imaging element 16 having the Bayer arrangement, normal pixel rows in which only the normal pixels are arranged in the horizontal direction (row direction) include an RG row in which a pixel (R pixel) having the R filter and a pixel (G pixel) having the G filter are alternately arranged in the row direction, and a GB row in which the G pixel and a pixel (B pixel) having the B filter are alternately arranged in the row direction. In addition, the RG row and the GB row are alternately arranged in the vertical direction (column direction).

In addition, the G filter is arranged in each of the first phase difference pixel ZA and the second phase difference pixel ZB of the present example. In the first phase difference pixel ZA and the second phase difference pixel ZB, for example, light in a wavelength range wider than the transmission wavelength range of the G filter may be incident without arranging the G filter.

In the imaging element 16, a phase difference pixel row in which the first phase difference pixel ZA, the second phase difference pixel ZB, and the normal pixel are periodically arranged in the row direction is disposed in the GB row at an interval of a plurality of rows. Only the normal pixels are arranged in at least two rows adjacent to the phase difference pixel row.

In addition, in the phase difference pixel row of the present example, three pixels including the pair of the first phase difference pixel ZA and the second phase difference pixel ZB and one normal pixel are periodically arranged with the three pixels as one cycle. Accordingly, in the phase difference pixel row, the G pixel and the B pixel are alternately arranged in the row direction at an interval of two pixels (the pair of the first phase difference pixel ZA and the second phase difference pixel ZB).

While the phase difference pixel row of the present example is disposed in the GB row of the Bayer arrangement, the phase difference pixel row is not for limitation purposes and may be disposed in the RG row.

In the imaging element 16 having the above configuration, as illustrated in FIG. 4, in a case where only the normal pixels extending in the second direction (column direction) from positions (positions indicated by black star marks in FIG. 4) at which the normal pixels (G pixel or B pixel) of the phase difference pixel row are arranged are extracted, color arrangement of the color filter of each pixel of the plurality of extracted normal pixels forms the Bayer arrangement.

In addition, an image of one frame (frame image) constituting the motion picture has a smaller image size than the still picture of full pixels, and the imaging element 16 is driven in a thinned-out manner in the motion picture imaging mode. Accordingly, low power and high speed processing can be achieved.

Even in a case where an image signal is read from the imaging element 16 in a thinned-out manner at a certain row interval (rows indicated by black circle marks in FIG. 4) as illustrated in FIG. 4, extracting only the normal pixels extending in the column direction from the positions at which the normal pixels of the phase difference pixel row are arranged in the image corresponding to the image signal read in a thinned-out manner results in the color arrangement of the color filter of each pixel of the plurality of extracted normal pixels forming the Bayer arrangement.

That is, even in a case where the rows read from the imaging element 16 in a thinned-out manner include the phase difference pixel row, it is possible not to include the first phase difference pixel ZA and the second phase difference pixel ZB in the frame image constituting the motion picture. In addition, by reading the phase difference pixel row, phase difference AF based on the first phase difference pixel ZA and the second phase difference pixel ZB included in the phase difference pixel row can be performed during imaging of the motion picture.

FIG. 5 is a plan view schematically illustrating the pair of the first phase difference pixel ZA and the second phase difference pixel ZB.

As illustrated in FIG. 5, the first phase difference pixel ZA includes the opening portion in the right half of the pixel, and the second phase difference pixel ZB includes the opening portion in the left half of the pixel. That is, the opening portions of the pair of the first phase difference pixel ZA and the second phase difference pixel ZB face each other.

Accordingly, in a case where the image signals (pixel values) of the pair of the first phase difference pixel ZA and the second phase difference pixel ZB are added, the added pixel value (addition pixel value) is almost equal to the pixel value of the normal pixel at the same pixel position. In addition, the added pixel (addition pixel) can be regarded as being midway between the pair of the first phase difference pixel ZA and the second phase difference pixel ZB.

The normal pixel and the phase difference detection pixel have different pixel characteristics. Thus, it is necessary to generate the still picture of full pixels after appropriately correcting the phase difference detection pixel.

The correction of the phase difference pixel is performed by "average value interpolation" in which interpolation is performed using the weighted average value of the pixel values of a plurality of normal pixels present around the in-focus phase difference detection pixel (the first phase difference pixel ZA or the second phase difference pixel ZB).

The pixel value (in the present example, corresponds to the pixel value of the G pixel of the normal pixel) of the addition pixel including the pair of the first phase difference pixel ZA and the second phase difference pixel ZB can be used in a case where the pixel value of the G pixel at the pixel position of the in-focus pixel of the first phase difference pixel ZA or the second phase difference pixel ZB is interpolated using the average value interpolation. Details of the correction of the phase difference value will be described below.

Figure 6:
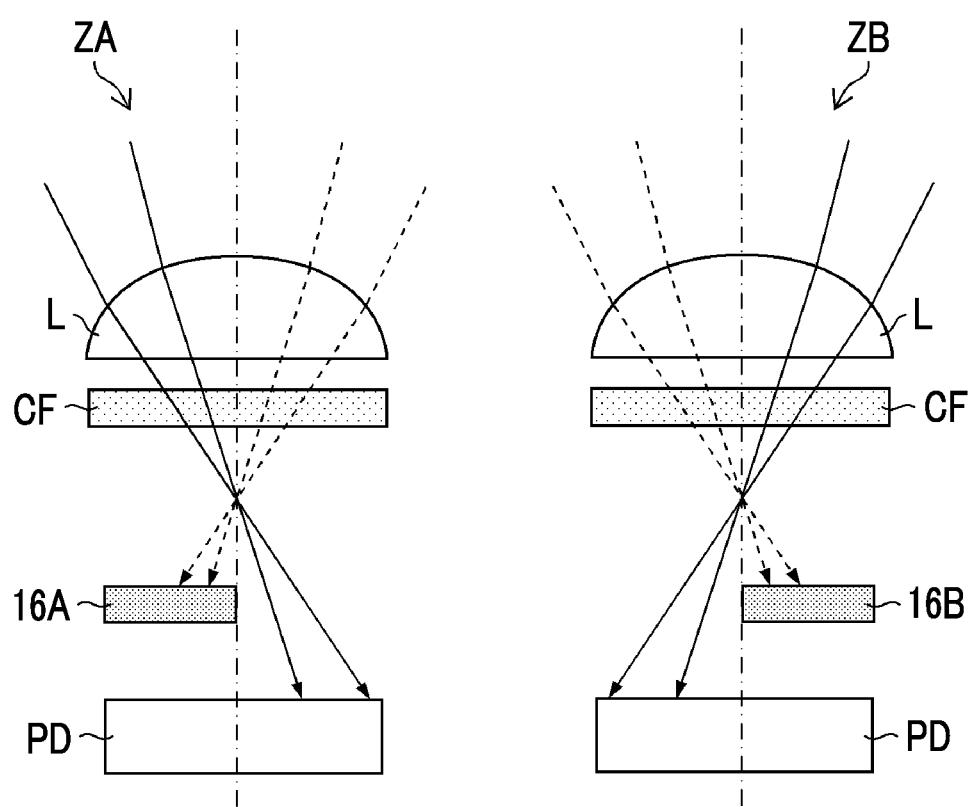
FIG. 6 is an enlarged main view illustrating configurations of the first phase difference pixel ZA and the second phase difference pixel ZB.

FIG. 6 is an enlarged main view illustrating configurations of the first phase difference pixel ZA and the second phase difference pixel ZB.

As illustrated in FIG. 6, a light shielding member 16A is arranged on the front surface side (microlens L side) of a photodiode PD of the first phase difference pixel ZA, and a light shielding member 16B is arranged on the front surface side of the photodiode PD of the second phase difference pixel ZB. The microlens L and the light shielding members 16A and 16B have a pupil separation function. In FIG. 6, the light shielding member 16A shields the left half of the light-receiving surface of the photodiode PD from light. Thus, the first phase difference pixel ZA receives only a luminous flux passing on the left side of an optical axis among luminous fluxes passing through an exit pupil of the imaging lens 12. In addition, in the present example, the G filter is arranged below the microlens L as a color filter CF.

The light shielding member 16B shields the right half of the light-receiving surface of the photodiode PD of the second phase difference pixel ZB from light. Thus, the second phase difference pixel ZB receives only a luminous flux passing on the right side of the optical axis among the luminous fluxes passing through the exit pupil of the imaging lens 12. By the microlens L and the light shielding members 16A and 16B having the pupil separation function, the luminous fluxes passing through the exit pupil on the left and right sides are separated and are respectively incident on the first phase difference pixel ZA and the second phase difference pixel ZB.

Returning to FIG. 3, the image signal (image data) read from the imaging element 16 at the time of imaging the motion picture or the still picture is temporarily stored in a memory (synchronous dynamic random access memory (SDRAM)) 48 or is input into an AF processing unit 42, an AE detection unit 44, and the like through an image input controller 22.

The CPU 40 manages and controls each unit of the imaging apparatus 10 based on the operation in the operation unit 38 and performs an AF operation and an AE operation at all times during imaging (display) of the live view image and imaging (recording) of the motion picture.

The AF processing unit 42 functioning as a phase difference detection unit is a part performing the phase difference AF process and detects the phase difference using the output signal of each of the first phase difference pixel ZA and the second phase difference pixel ZB obtained through the image input controller 22. Details of the detection of the phase difference by the AF processing unit 42 will be described below.

In a case where phase difference data indicating the phase difference is input from the AF processing unit 42, the CPU 40 functions as a focal point adjusting unit that performs the phase difference AF based on the phase difference data. That is, the CPU 40 calculates a deviation amount (defocus amount) between a focus position of the imaging lens 12 and an image forming surface of the imaging element 16 based on the phase difference data and moves a focus lens in the imaging lens 12 through a lens drive unit 36 such that the calculated defocus amount becomes zero. The calculation of the defocus amount may be performed by the AF processing unit 42.

The AE detection unit 44 calculates the integrating accumulation of the image data (for example, the pixel values of the G pixels of the whole screen) obtained through the image input controller 22 or calculates the integrating accumulation of the image data (pixel values of the G pixels) differently weighted between a center portion and a peripheral portion of the screen and outputs the integrating accumulation value to the CPU 40. The CPU 40 calculates the brightness (imaging exposure value (Ev value)) of the subject from the integrating accumulation value input from the AE detection unit 44. In a case where the imaging mode is the still picture imaging mode, the CPU 40 performs the above AF control again in a case where the shutter button 2 is subjected to a first stage push (half push). In a case where the shutter button 2 is subjected to the full push, the CPU 40 calculates the brightness (imaging Ev value) of the subject, decides the F-number of the stop 14 and a light exposure time (shutter speed) of the mechanical shutter 15 based on the calculated imaging Ev value, and images the still picture (exposure control).

In a case where the imaging mode is the motion picture imaging mode, the CPU 40 starts imaging and recording (picture recording) the motion picture in a case where the shutter button 2 is subjected to the full push. At the time of imaging the motion picture, the CPU 40 opens the mechanical shutter 15, consecutively reads (for example, 30 frames/second or 60 frames/second as a frame rate) the image data from the imaging element 16, consecutively performs the phase difference AF, calculates the brightness of the subject, and controls the shutter speed (a charge accumulation time by rolling shutter) by a shutter drive unit 33 and/or the stop 14 by a stop drive unit 34.

The CPU 40 operates the zoom lens to advance and retract in the optical axis direction through the lens drive unit 36 in response to the zoom instruction from the zoom button 5 and changes the focal length.

In addition, ROM 47 is a read only memory (ROM) or an electrically erasable programmable read-only memory (EEPROM) storing defect information related to the imaging element 16 and various parameters and tables used in image processing and the like. In the present example, the ROM 47 stores information related to the phase difference pixel row (including the pixel positions of the first phase difference pixel ZA and the second phase difference pixel ZB) and the normal pixel row of the imaging elements 16 and gain interpolation information, a level adjusting coefficient, and the like described below.

The image processing unit 24 functioning as a first image generation unit and a second image generation unit reads non-processed image data (RAW data) that is temporarily stored in the memory 48 and is obtained through the image input controller 22 at the time of imaging the motion picture or the still picture. The image processing unit 24 performs an offset process, a pixel interpolation process (interpolation process for the phase difference detection pixel, a defective pixel, and the like), white balance correction, a gain control process including sensitivity correction, gamma-correction processing, demosaicing (referred to as a "demosaicing process"), a brightness and color difference signal generation process, a contour highlighting process, color correction, and the like on the read RAW data.

The image data processed as the live view image by the image processing unit 24 is input into a video random access memory (VRAM) 50.

The VRAM 50 includes an A region and a B region. In each of the A region and the B region, image data representing an image of one frame is recorded. In the VRAM 50, the image data representing the image of one frame is alternately rewritten between the A region and the B region. The written image data is read from a region of the A region and the B region of the VRAM 50 other than a region in which the image data is rewritten.

The image data read from the VRAM 50 is encoded in a video encoder 28 and is output to the liquid crystal monitor 30 disposed on the rear surface of the camera. Accordingly, the live view image showing the subject image is displayed on the liquid crystal monitor 30.

The image data (brightness data (Y) and color difference data (Cb) and (Cr)) processed as the still picture or the motion picture for recording by the image processing unit 24 is stored in the memory 48 again.

A compression/expansion processing unit 26 performs a compression process on the brightness data (Y) and the color difference data (Cb) and (Cr) processed by the image processing unit 24 and stored in the memory 48 at the time of recording the still picture or the motion picture. In the case of the still picture, for example, the compression is performed in the Joint Photographic Experts Group (JPEG) format. In the case of the motion picture, for example, the compression is performed in the H.264 format. The compression image data compressed by the compression/expansion processing unit 26 is recorded in the memory card 54 through a media controller 52.

In addition, the compression/expansion processing unit 26 performs an expansion process on the compression image data obtained from the memory card 54 through the media controller 52 at the time of the playback mode. For example, the media controller 52 records and reads the compression image data in the memory card 54.

[Phase Difference AF]

In the case of performing the phase difference AF, the CPU 40 functioning as an autofocus control unit outputs a read instruction for reading the image data of the phase difference pixel row in at least an AF region of the imaging element 16 to a sensor drive unit 32 and reads the corresponding image data from the imaging element 16.

At the time of imaging and displaying the motion picture (including the live view image), the CPU 40 obtains a thinning-out rate for reading the image data from the imaging element 16 in a thinned-out manner. The thinning-out rate may be a preset fixed value or may be able to be selected by a user from a plurality of thinning-out rates. For example, the optimal thinning-out rate can be set in connection with selection of the image size of the motion picture or selection of the frame rate. The rows read in a thinned-out manner include the phase difference pixel row.

The CPU 40 outputs a read instruction indicating a thinning-out pattern (extraction pattern) corresponding to the thinning-out rate to the sensor drive unit 32 and reads the image data from the imaging element 16 in a thinned-out manner.

The AF processing unit 42 extracts output data of the phase difference detection pixel (the first phase difference pixel ZA and the second phase difference pixel ZB) in the AF region from the read phase difference pixel row and detects the phase difference between the output data (first pixel value) of the first phase difference pixel ZA and the output data (second pixel value) of the second phase difference pixel ZB. For example, the phase difference is obtained from a shift amount in the left-right direction between the first pixel value and the second pixel value when the correlation between the first pixel value and the second pixel value of the pair of the first phase difference pixel ZA and the second phase difference pixel ZB is the maximum (when the integrating accumulation value of the absolute value of the difference between the pixel values of the pair of the phase difference pixels is the minimum).

A value obtained by correcting the obtained shift amount by a positional deviation in the horizontal direction between the pair of the first phase difference pixel ZA and the second phase difference pixel ZB can be calculated as the phase difference data. A method of calculating the phase difference is not limited to the above method, and various methods can be applied.

Next, the CPU 40 calculates the deviation amount (defocus amount) between the focus position of the imaging lens 12 (imaging optical system) and the image forming surface of the imaging element 16 based on the phase difference data detected by the AF processing unit 42. The calculation of the defocus amount may be performed by the AF processing unit 42.

The CPU 40 performs the phase difference AF by moving the focus lens in the imaging lens 12 through the lens drive unit 36 based on the calculated defocus amount such that the defocus amount becomes zero.

In the imaging element 16, the pair of the first phase difference pixel ZA and the second phase difference pixel ZB is adjacently arranged to have the opening portions facing each other. Thus, the interval between the pair of the first phase difference pixel ZA and the second phase difference pixel ZB is the minimum. Accordingly, a spatial sampling frequency of the phase difference can be maximized, and the phase difference AF for the subject having a high spatial frequency can be performed with higher accuracy than that in a case where the pair of the first phase difference pixel and the second phase difference pixel is separately arranged with the normal pixel interposed therebetween.

The rows read from the imaging element 16 in a thinned-out manner at the time of generating the motion picture can include the phase difference pixel row including the phase difference detection pixel (the first phase difference pixel ZA and the second phase difference pixel ZB). The phase difference AF can be appropriately performed even during imaging of the motion picture.

[Imaging and Recording of Motion Picture]

As described above, at the time of imaging and recording (displaying) the motion picture in the motion picture imaging mode, the CPU 40 (second image generation unit) reads the image data from the imaging element 16 in a thinned-out manner. In FIG. 4, the rows of the imaging element 16 indicated by the black circle marks show one example of the rows read in a thinned-out manner at the time of imaging the motion picture.

In a case where the image data is read from the imaging element 16 in a thinned-out manner, the pixels in the row direction are not thinned out. However, for the phase difference pixel row, the image processing unit 24 (second image generation unit) extracts only the normal pixels at the positions (positions indicated by the black star marks in FIG. 4) at which the normal pixels (G pixel or B pixel) of the phase difference pixel row are arranged as illustrated in FIG. 4. For the normal pixel row, the image processing unit 24 calculates the average of three horizontal pixels (three pixels having the same color) and substantially generates a pixel at a horizontal thinning-out rate of ⅓. For the normal pixel row, only the normal pixels at the positions indicated by the black star marks may be extracted (reading at a horizontal thinning-out rate of ⅓) instead of the process of calculating the average of three horizontal pixels.

A plurality of two-dimensionally arranged pixels constituting one frame image of the motion picture (second image) read in a thinned-out manner have the arrangement of the color filters in the Bayer arrangement. In addition, the motion picture includes only the normal pixels, and it is not necessary to correct the phase difference detection pixel. Thus, a false color does not occur.

That is, while the output data of the phase difference detection pixel (the first phase difference pixel ZA and the second phase difference pixel ZB) cannot be used as the image data of the G pixel or the B pixel of the motion picture, the plurality of pixels constituting one frame image of the motion picture originally include the normal pixels and do not include the phase difference detection pixel as described above. Thus, it is not necessary to generate the image data of the phase difference detection pixel by the interpolation process, and a calculation load in the image processing unit 24 can be reduced.

In addition, each frame image constituting the motion picture has a smaller image size than the still picture of full pixels. Thus, in the motion picture imaging mode, the imaging element 16 can be driven in a thinned-out manner. Accordingly, low power and high speed processing can be achieved.

Furthermore, each frame image constituting the motion picture has the Bayer arrangement in the same manner as the filter arrangement of the imaging element 16. Thus, the image processing unit 24 can implement the image processing of the motion picture in common with the image processing (for example, the demosaicing process) of the still picture.

The second image generated by reading in a thinned-out manner is not limited to the motion picture and may be a still picture having a small image size than the still picture of full pixels.

[Interpolation Processing Unit]

Figure 7:
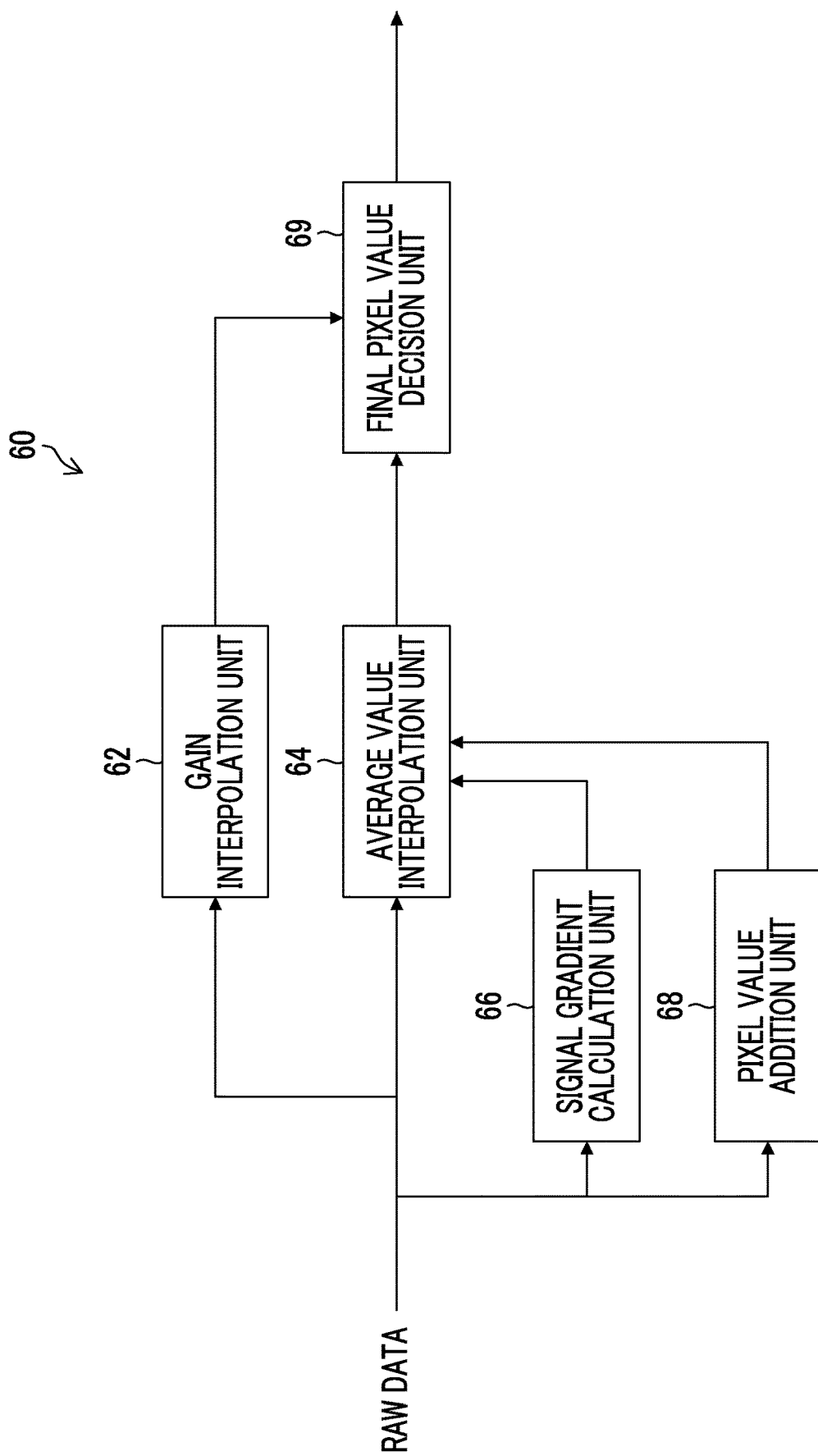
FIG. 7 is a block diagram illustrating an embodiment of an interpolation processing unit in an image processing unit 24 illustrated in FIG. 3.

FIG. 7 is a block diagram illustrating an embodiment of an interpolation processing unit in the image processing unit 24 illustrated in FIG. 3.

An interpolation processing unit 60 illustrated in FIG. 7 is a part correcting (interpolating) the pixel value of the phase difference detection pixel (the first phase difference pixel ZA and the second phase difference pixel ZB) included in the image data (RAW data) read from the imaging element 16 at the time of switching to the still picture imaging mode and imaging the still picture (first image). The interpolation processing unit 60 functions as a part of the first image generation unit generating the first image.

The interpolation processing unit 60 includes a gain interpolation unit 62, an average value interpolation unit 64, a signal gradient calculation unit 66, a pixel value addition unit 68, and a final pixel value decision unit 69.

Approximately half of the intensity of light incident on the surrounding normal pixels is incident on the phase difference detection pixel (the first phase difference pixel ZA and the second phase difference pixel ZB). Thus, sensitivity is decreased below that of the normal pixel, and the phase difference detection pixel cannot be used as the normal pixel.

The gain interpolation unit 62 performs interpolation in which a signal level is adjusted to that of the normal pixel by multiplying the pixel value of the phase difference detection pixel by predetermined gain interpolation information in order to supplement the decrease in sensitivity of the phase difference detection pixel.

The interpolation processing unit 60 (or the image processing unit 24) includes a gain interpolation information obtaining unit that obtains the gain interpolation information set for the pixel position of the in-focus pixel in the RAW data in a case where a correction target of the first phase difference pixel ZA or the second phase difference pixel ZB is set as the in-focus pixel.

The gain interpolation information obtaining unit may calculate the gain interpolation information corresponding to the pixel position of the in-focus pixel based on the RAW data or may obtain the gain interpolation information from a storage unit storing the gain interpolation information for each pixel position of the in-focus pixel. The gain interpolation information can be calculated as the ratio of the pixel value of the in-focus pixel in the RAW data to the average pixel value of the normal pixels having the same color and surrounding the in-focus pixel.

The average value interpolation unit 64 is a part generating the pixel value at the pixel position of the in-focus pixel using the pixel values of the surrounding pixels of the pixel position of the in-focus pixel. The average value interpolation unit 64 is provided with information indicating a signal gradient direction calculated by the signal gradient calculation unit 66 and the addition pixel value of the addition pixel added by the pixel value addition unit 68.

The signal gradient calculation unit 66 calculates the signal gradient direction in which the signal gradients of the surrounding pixels of the pixel position of the in-focus pixel are minimized in the case of generating the pixel value at the pixel position of the in-focus pixel.

Figures 8, 9:
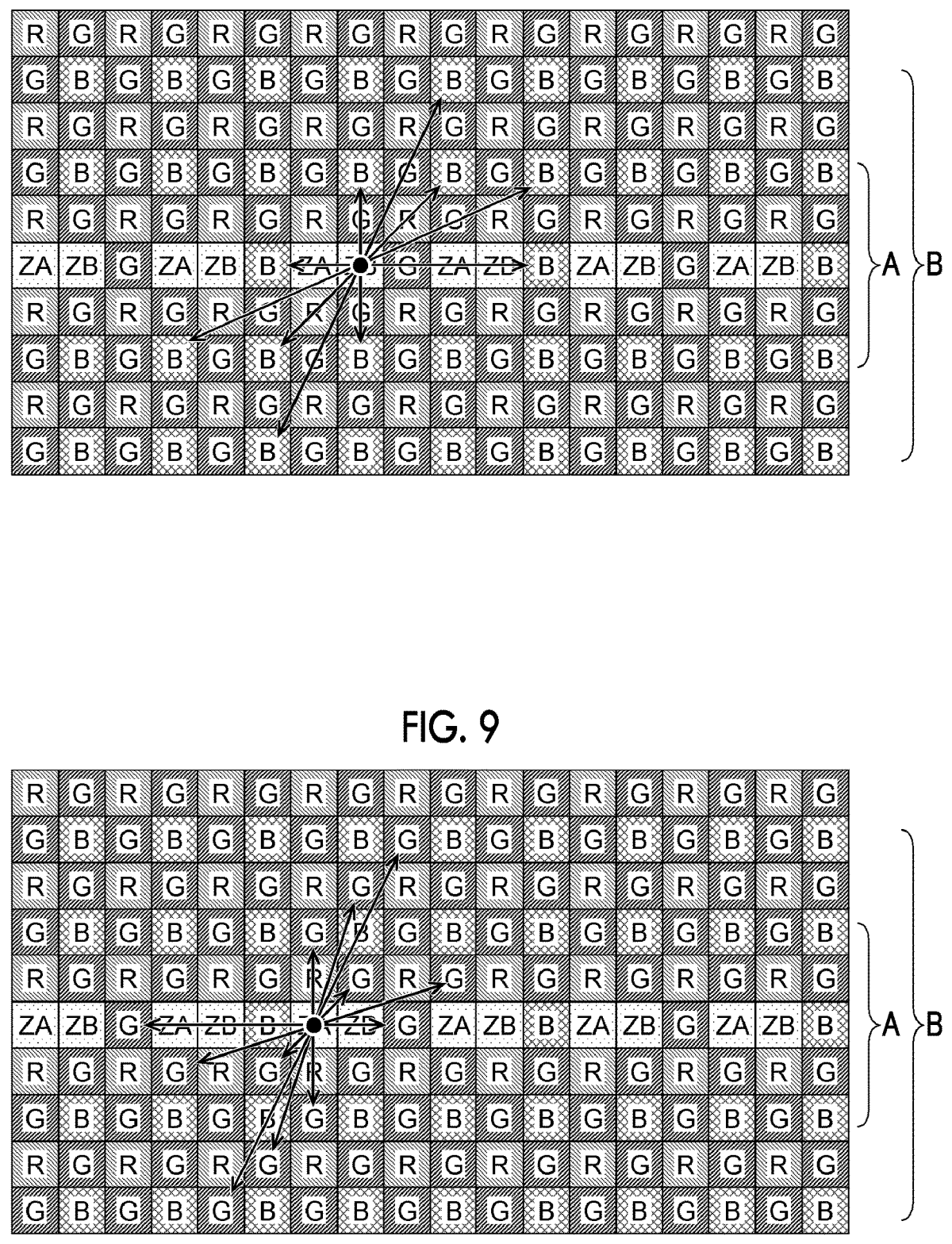

FIG. 8 is a diagram for describing the average value interpolation for the phase difference detection pixel in the imaging element of the first embodiment and illustrates the case of calculating the signal gradient direction based on the surrounding pixels of the in-focus pixel indicated by a black circle in FIG. 8 and interpolating the pixel value at the pixel position of the in-focus pixel.

As illustrated in FIG. 8, in the case of calculating the signal gradient direction based on the surrounding pixels of the in-focus pixel (second phase difference pixel ZB) indicated by the black circle, the signal gradient calculation unit 66 obtains the pixel values of the G pixels surrounding the in-focus pixel, calculates the signal gradient of the horizontal direction from, for example, the pixel interval between two G pixels closest to each other in the horizontal direction (first direction) and the difference between the pixel values of two G pixels, and in the same manner, calculates the signal gradient of the vertical direction (second direction), the signal gradient of a third direction (inclined upper right direction) between the first direction and the second direction, and the signal gradient of a fourth direction (inclined lower right direction). The signal gradient calculation unit 66 calculates the direction of the minimum signal gradient among the calculated signal gradients of the four directions as the signal gradient direction.

The use of the pixel value of the G pixel in the calculation of the signal gradient direction is because the pixel value of the G pixel contributes most to obtaining the brightness signal (Y) among the pixel values of the R pixel, the G pixel, and the B pixel. The signal gradient direction calculated in the above manner corresponds to a direction having the highest correlation with the brightness among the four directions.

The in-focus pixel illustrated in FIG. 8 corresponds to the position of the B pixel. Thus, the signal gradient direction may be calculated using the pixel values of the B pixels surrounding the in-focus pixel, or the signal gradient direction may be calculated using the RGB pixels surrounding the in-focus pixel.

In the case of interpolating the pixel value at the pixel position of the in-focus pixel, the average value interpolation unit 64 detects a plurality of pixels that are present in the signal gradient direction calculated by the signal gradient calculation unit 66 with the pixel position of the in-focus pixel as a reference and have the same color as the color at the pixel position of the in-focus pixel, and generates the pixel value at the pixel position of the in-focus pixel by interpolating the pixel values of the plurality of detected pixels. In the example illustrated in FIG. 8, the color at the pixel position of the in-focus pixel is blue (B). Thus, a plurality of B pixels present in the signal gradient direction are detected, and the pixel value at the pixel position of the in-focus pixel is generated by interpolating the pixel values of the plurality of detected B pixels.

In addition, as illustrated in FIG. 8, only the normal pixel rows are arranged in upper two rows and lower two rows adjacent to the phase difference pixel row. Thus, by using the normal pixels (B pixels) in the phase difference pixel row and the upper two rows and the lower two rows (range A of total five rows) adjacent to the phase difference pixel row, the average value interpolation unit 64 can generate the pixel value at the pixel position of the in-focus pixel using the B pixels in any direction (signal gradient direction) of the horizontal direction, the vertical direction, the inclined upper right direction, and the inclined lower right direction.

In addition, by using the normal pixels in the range A of five rows, the average value interpolation unit 64 can interpolate the pixel value at the pixel position of the in-focus pixel using the B pixels in a direction midway between the horizontal direction and the inclined upper right direction and a direction midway between the horizontal direction and the inclined lower right direction.

Furthermore, in a case where the range of normal pixels used in the interpolation is increased to include the phase difference pixel row and upper four rows and lower four rows (range B of total nine rows) adjacent to the phase difference pixel row, the average value interpolation unit 64 can increase the number of directions in which the pixel value at the pixel position of the in-focus pixel can be interpolated. That is, in a case where the range of normal pixels used in the interpolation is increased to the range B of nine rows, the average value interpolation unit 64 can interpolate the pixel value at the pixel position of the in-focus pixel using the B pixels in any direction (signal gradient direction) of eight directions including four directions of the horizontal direction, the vertical direction, the inclined upper right direction, and the inclined lower right direction, and four directions midway among the four directions.

In this case, the signal gradient calculation unit 66 needs to calculate one direction of the eight directions as the signal gradient direction.

FIG. 9 is another diagram for describing the average value interpolation for the phase difference detection pixel in the imaging element of the first embodiment and illustrates the case of calculating the signal gradient direction based on the surrounding pixels of the in-focus pixel indicated by a black circle in FIG. 9 and interpolating the pixel value at the pixel position of the in-focus pixel.

As illustrated in FIG. 9, the in-focus pixel indicated by the black circle is the first phase difference pixel ZA, and the position of the in-focus pixel corresponds to the position of the G pixel. Accordingly, it is preferable that the signal gradient calculation unit 66 calculates the signal gradient direction by obtaining the pixel values of the G pixels surrounding the in-focus pixel.

In addition, in the same manner as the method of interpolating the pixel value at the pixel position of the in-focus pixel (second phase difference pixel) illustrated in FIG. 8, the average value interpolation unit 64 detects a plurality of pixels that are present in the signal gradient direction with the pixel position of the in-focus pixel as a reference and have the same color as the color at the pixel position of the in-focus pixel based on the signal gradient direction calculated by the signal gradient calculation unit 66 for the surrounding pixels of the in-focus pixel, and generates the pixel value at the pixel position of the in-focus pixel by interpolating the pixel values of the plurality of detected pixels.

In the example illustrated in FIG. 9, the color at the pixel position of the in-focus pixel is green (G). Thus, the average value interpolation unit 64 detects a plurality of G pixels present in the signal gradient direction and generates the pixel value at the pixel position of the in-focus pixel by interpolating the pixel values of the plurality of detected G pixels. In addition, by using the normal pixels (G pixels) in the range A of five rows including the phase difference pixel row, the average value interpolation unit 64 can generate (interpolate) the pixel value at the pixel position of the in-focus pixel using the G pixels in any direction of the horizontal direction, the vertical direction, the inclined upper right direction, and the inclined lower right direction. Furthermore, in a case where the range of normal pixels used in the interpolation is increased to the range B of nine rows including the phase difference pixel row, the average value interpolation unit 64, by using the normal pixels (G pixels) in the range B of nine rows, can interpolate the pixel value at the pixel position of the in-focus pixel using the G pixels in any direction of eight directions including four directions of the horizontal direction, the vertical direction, the inclined upper right direction, and the inclined lower right direction, and four directions midway among the four directions.

Next, a case where the pair of the first phase difference pixel ZA and the second phase difference pixel ZB is used in the average value interpolation will be described.

In FIG. 7, the pixel value addition unit 68 obtains the addition pixel value of the addition pixel by adding the pixel values of the pair of the first phase difference pixel ZA and the second phase difference pixel ZB.

As described using FIG. 5, in a case where the pixel values of the pair of the first phase difference pixel ZA and the second phase difference pixel ZB are added, the added pixel value (addition pixel value) is equal to the pixel value of the normal pixel (G pixel) at the same pixel position. In addition, the added pixel (addition pixel) can be regarded as being midway between the pair of the first phase difference pixel ZA and the second phase difference pixel ZB.

The addition pixel value of the addition pixel is a value close to the pixel value of the G pixel at the same pixel position and does not match the pixel value of the G pixel in a strict sense. Therefore, it is preferable to adjust the level of the addition pixel value by multiplying the addition pixel value by the level adjusting coefficient of the addition pixel that is preset or calculated by analyzing the image data.

In a case where the color at the pixel position of the in-focus pixel is green (G), the average value interpolation unit 64 interpolates the pixel value of the in-focus pixel using the addition pixel value of the addition pixel added by the pixel value addition unit as the pixel value of one of the surrounding pixels of the in-focus pixel.

In a case where the normal pixels surrounding the in-focus pixel are saturated, or, for example, in the case of an image in which the surrounding area of the in-focus pixel is even, it is preferable not to use the addition pixel value in the average value interpolation.

In addition, in the case of the image in which the surrounding area of the in-focus pixel is even, the signal gradient calculation unit 66 can determine that the signal gradient direction is not present. In a case where the signal gradient direction is not calculated by the signal gradient calculation unit 66, the average value interpolation unit 64 can set the pixel value at the pixel position of the in-focus pixel to be the pixel value of the pixel closest to the pixel position of the in-focus pixel and having the same color, or the average value of pixel values of a plurality of pixels having the same color in the interpolation range with the pixel position of the in-focus pixel as a reference.

The final pixel value decision unit 69 decides the final pixel value at the pixel position of the in-focus pixel by selecting any one of pixel values including the pixel value interpolated by the gain interpolation unit 62 and the pixel value interpolated by the average value interpolation unit 64 or generating a pixel value obtained by weighted addition of two pixel values. For example, in a case where the image surrounding the in-focus pixel is even, the pixel value obtained by the average value interpolation is preferred. In a case where the spatial frequency of the image surrounding the in-focus pixel is high, the pixel value obtained by the gain interpolation is preferred. In addition, in a region out of focus, the pixel value obtained by the average value interpolation is preferred.

As described above, the interpolation processing unit 60 corrects (interpolates) the pixel value of the phase difference detection pixel included in the RAW data read from the imaging element 16 at the time of imaging the still picture. Accordingly, the RAW data of the still picture in which the pixel value at the pixel position of the phase difference detection pixel is corrected is generated.

Second Embodiment of Imaging Element

FIG. 10 is a diagram illustrating a second embodiment of color filter arrangement and arrangement of the phase difference detection pixels in the imaging element 16.

As illustrated in FIG. 10, the first periodic color arrangement of the R filter, the G filter, and the B filter arranged in each pixel of the imaging element 16 has a basic arrangement pattern P of 4×4 pixels illustrated by a bold box. The basic arrangement pattern P is adjacently arranged in the horizontal direction and the vertical direction.

The basic arrangement pattern P is arranged such that 2×2 pixels including the G filters and 2×2 pixels including the R filters are adjacent to each other in the horizontal direction, and 2×2 pixels including the B filters and 2×2 pixels including the G filters are adjacent to each other in the horizontal direction.

The phase difference pixel row including the first phase difference pixel ZA and the second phase difference pixel ZB is periodically arranged in the row direction (horizontal direction) with three pixels including the pair of the first phase difference pixel ZA and the second phase difference pixel ZB and one normal pixel (in the present example, the G pixel or the B pixel) as one cycle. The phase difference pixel row is disposed in a row (in the present example, a row in which the G pixels and the B pixels are arranged) at an interval of a plurality of rows.

In the imaging element 16 having the above configuration, as illustrated in FIG. 10, in a case where only the normal pixels extending in the second direction (column direction) from positions (positions indicated by black star marks in FIG. 10) at which the normal pixels (G pixel or B pixel) of the phase difference pixel row are arranged are extracted, color arrangement of the color filter of each pixel of the plurality of extracted normal pixels is the same as the original color arrangement having the basic arrangement pattern P.

In addition, in the motion picture imaging mode, low power and high speed processing can be achieved by driving the imaging element 16 in a thinned-out manner. In a case where the image signal is read in a thinned-out manner from the imaging element 16 at a certain row interval (rows indicated by black circle marks in FIG. 10) as illustrated in FIG. 10, and only the normal pixels extending in the column direction from the positions at which the normal pixels of the phase difference pixel row are arranged are extracted in an image corresponding to the image signal read in a thinned-out manner, the color arrangement of the color filter of each pixel of the plurality of extracted normal pixels is the same as the original color arrangement having the basic arrangement pattern P.

Figures 11, 12:
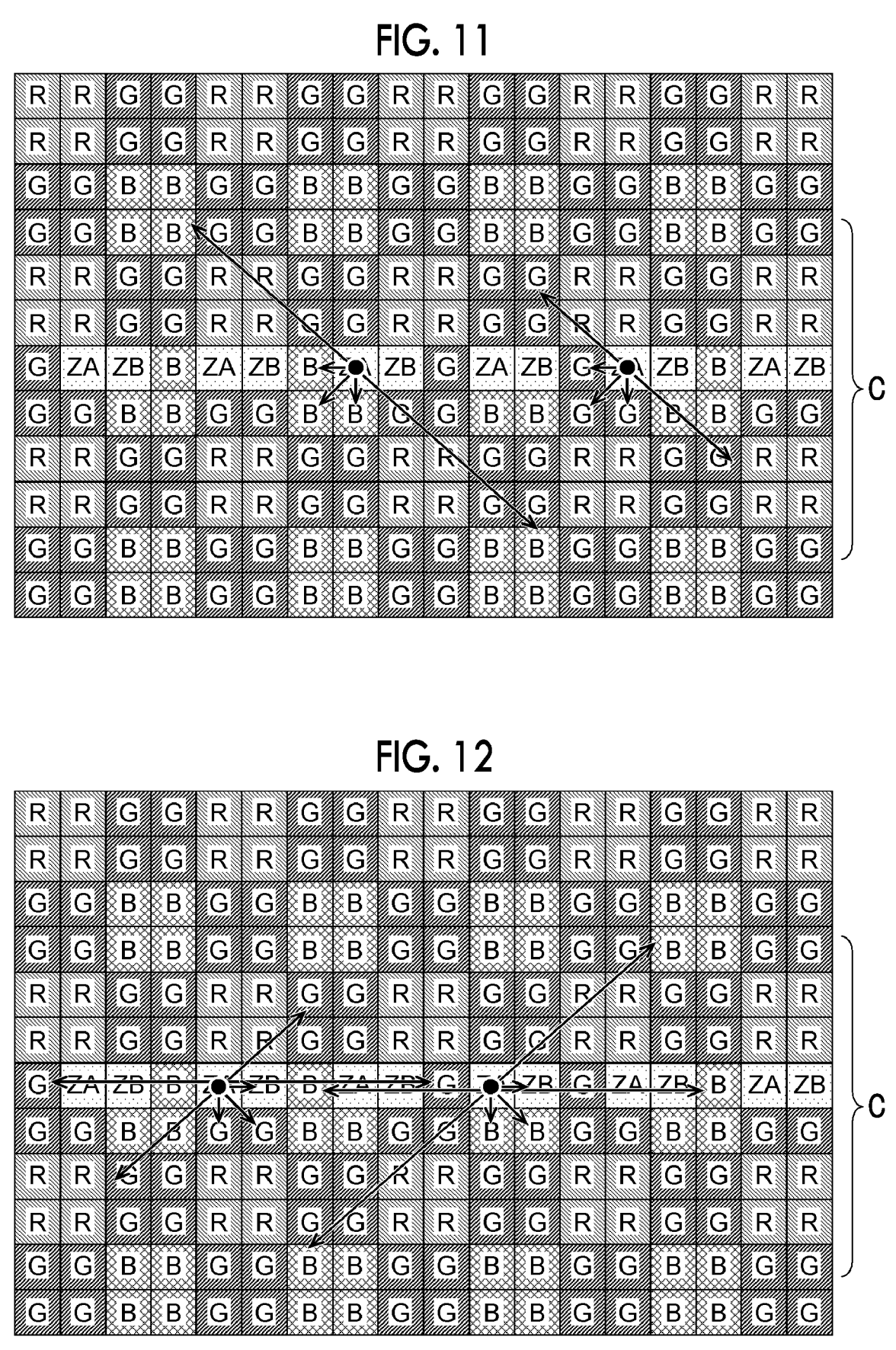

FIG. 11 and FIG. 12 are diagrams for describing the average value interpolation for the phase difference detection pixel in the imaging element of the second embodiment and illustrate the case of calculating the signal gradient direction based on the surrounding pixels of the in-focus pixel indicated by a black circle in FIG. 11 and FIG. 12 and interpolating the pixel value at the pixel position of the in-focus pixel.

As illustrated in FIG. 11 and FIG. 12, by not arranging the phase difference detection pixel in three rows above and four rows below the phase difference pixel row, the normal pixels in a range C of eight rows including the phase difference pixel row can be used in the case of interpolating the pixel value of the phase difference detection pixel included in the RAW data of the still picture obtained at the time of the still picture imaging mode.

That is, the signal gradient calculation unit 66 illustrated in FIG. 7 calculates the signal gradient direction (any direction of four directions including the horizontal direction, the vertical direction, the inclined upper right direction, and the inclined lower right direction) based on the surrounding pixels of the in-focus pixel indicated by the black circle. The average value interpolation unit 64 generates (interpolates) the pixel value at the pixel position of the in-focus pixel by interpolating the pixel values of the normal pixels (normal pixels in the range C of eight rows) having the same color in the signal gradient direction.

In the case of the color filter arrangement of the present example, the number of normal pixels having the same color and adjacent to the in-focus pixel is three in the case of FIG. 11 and two in the case of FIG. 12. Thus, in a case where a normal pixel having the same color and adjacent in the calculated signal gradient direction is present, it is preferable to use the pixel value of the adjacent normal pixel as the pixel value of the in-focus pixel.

The aspect of the imaging apparatus to which the present invention can be applied is not limited to the imaging apparatus 10 illustrated in FIG. 1 and is exemplified by, for example, a mobile phone having a camera function, a smartphone, personal digital assistants (PDA), and a portable game console. Hereinafter, one example of the smartphone to which the present invention can be applied will be described.

<Configuration of Smartphone>

Figure 13:
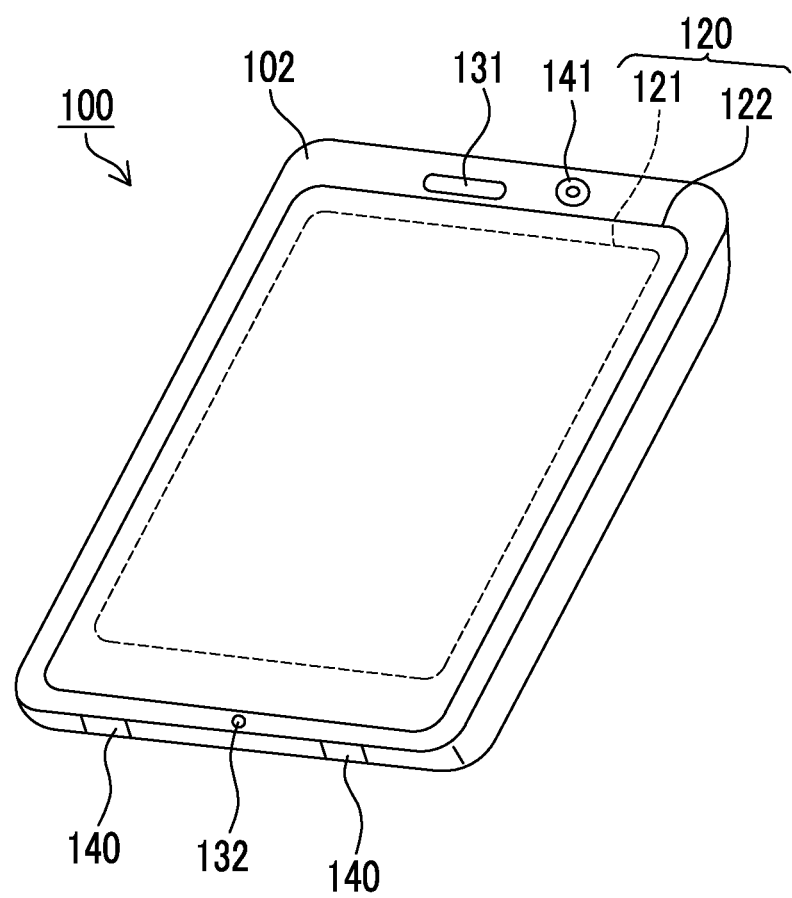
FIG. 13 is a diagram illustrating the exterior of a smartphone as one embodiment of the imaging apparatus.

FIG. 13 is a diagram illustrating the exterior of the smartphone as one embodiment of the imaging apparatus.

A smartphone 100 illustrated in FIG. 13 includes a casing 102 having a flat plate shape. A display and input unit 120 in which a display panel 121 as a display unit and an operation panel 122 as an input unit are formed as a single unit is disposed on one surface of the casing 102. In addition, the casing 102 comprises a speaker 131, a microphone 132, an operation unit 140, and a camera unit 141 (imaging unit). The configuration of the casing 102 is not for limitation purposes. For example, a configuration in which the display unit and the input unit are independently disposed can be employed, or a configuration having a folded structure or a sliding mechanism can be employed.

Figure 14:
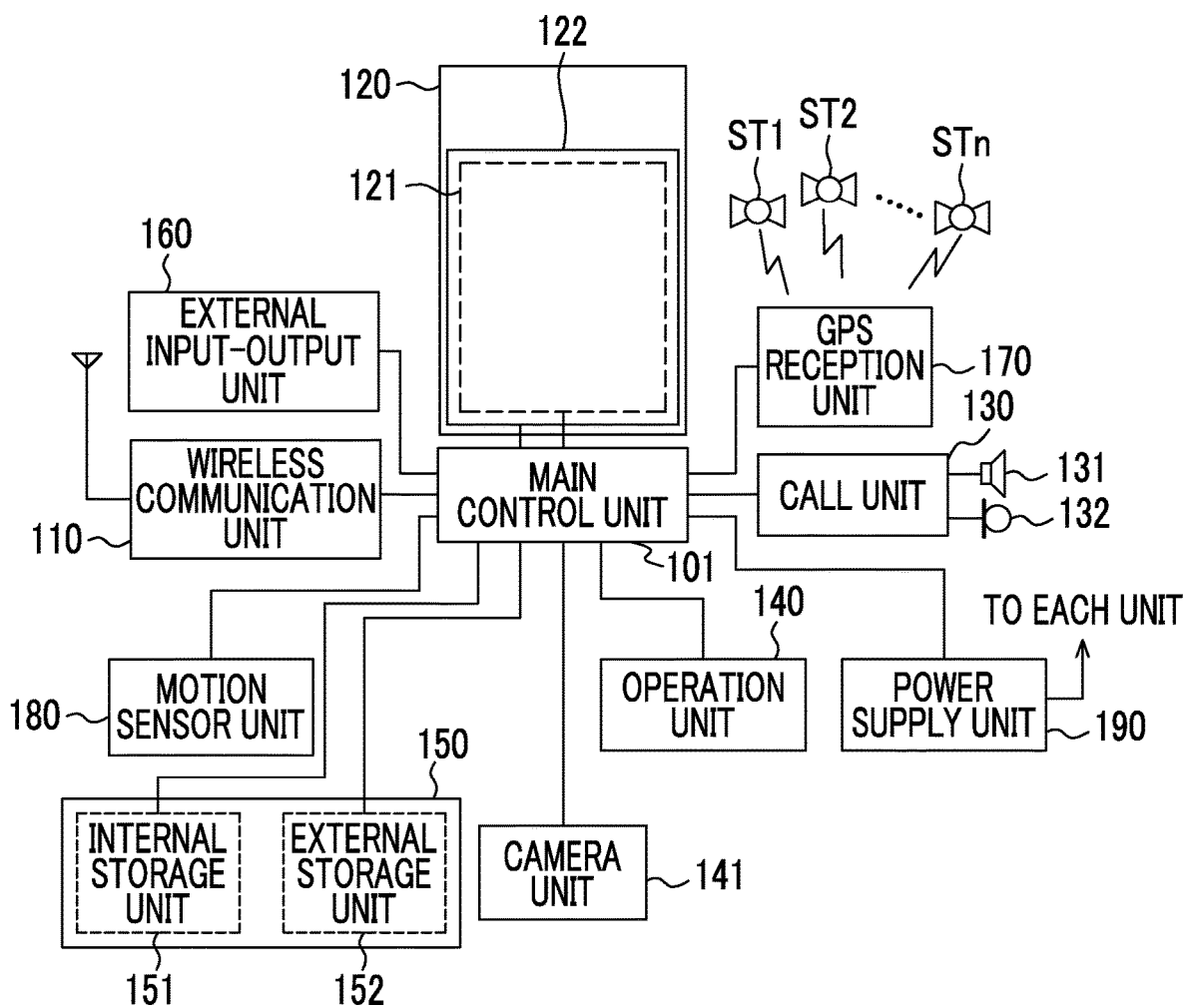
FIG. 14 is a block diagram illustrating an internal configuration of a smartphone 100 illustrated in FIG. 13.

FIG. 14 is a block diagram illustrating an internal configuration of the smartphone 100 illustrated in FIG. 13. As illustrated in FIG. 14, main constituents of the smartphone 100 comprise a wireless communication unit 110, the display and input unit 120, a call unit 130, the operation unit 140, the camera unit 141, a storage unit 150, an external input-output unit 160 (output unit), a global positioning system (GPS) reception unit 170, a motion sensor unit 180, a power supply unit 190, and a main control unit 101. In addition, a main function of the smartphone 100 comprises a wireless communication function of performing mobile wireless communication with a base station apparatus through a mobile communication network.

The wireless communication unit 110 performs wireless communication with the base station apparatus connected to the mobile communication network in accordance with an instruction from the main control unit 101. By using the wireless communication, transmission and reception of various file data such as voice data and image data, electronic mail data, and the like and reception of web data, streaming data, and the like are performed.

The display and input unit 120 is a so-called touch panel comprising the operation panel 122 arranged on the screen of the display panel 121. The display and input unit 120 visually delivers information to the user by displaying images (still image and motion image), text information, and the like and detects a user operation performed on the displayed information under control of the main control unit 101. The operation panel 122 is referred to as a touch panel for convenience.

The display panel 121 uses a liquid crystal display (LCD), an organic electro-luminescence display (OELD), or the like as a display device. The operation panel 122 is a device that is disposed in a state where the image displayed on the display surface of the display panel 121 can be visually recognized, and detects one or a plurality of coordinates operated by a finger of the user or a stylus. In a case where the device is operated by the finger of the user or the stylus, the operation panel 122 outputs a detection signal generated by the operation to the main control unit 101. Next, the main control unit 101 detects the operation position (coordinates) on the display panel 121 based on the received detection signal.

The display panel 121 and the operation panel 122 of the smartphone 100 illustrated in FIG. 13 constitute the display and input unit 120 as a single unit. The operation panel 122 is arranged to completely cover the display panel 121. In the case of employing such an arrangement, the operation panel 122 may comprise a function of detecting the user operation even in a region outside the display panel 121. In other words, the operation panel 122 may comprise a detection region (hereinafter, referred to as a "display region") for an overlapping part in overlap with the display panel 121 and a display region (hereinafter, referred to as a "non-display region") for the other peripheral part not in overlap with the display panel 121.

The size of the display region may completely match the size of the display panel 121. Both sizes do not necessarily match. In addition, the operation panel 122 may comprise two sensitive regions including the peripheral part and the other inner part. Furthermore, the width of the peripheral part is appropriately designed depending on the size and the like of the casing 102. Furthermore, a position detection method employed in the operation panel 122 is exemplified by a matrix switch method, a resistive film method, a surface acoustic wave method, an infrared method, an electromagnetic induction method, an electrostatic capacitive method, and the like. Any method may be employed.

The call unit 130 comprises the speaker 131 and the microphone 132. The call unit 130 converts the voice of the user input through the microphone 132 into voice data processable in the main control unit 101 and outputs the voice data to the main control unit 101, or decodes the voice data received by the wireless communication unit 110 or the external input-output unit 160 and outputs the decoded voice data from the speaker 131. In addition, as illustrated in FIG. 13, for example, the speaker 131 and the microphone 132 can be mounted on the same surface as the surface on which the display and input unit 120 is disposed.

The operation unit 140 is a hardware key using a key switch or the like and receives an instruction from the user. For example, as illustrated in FIG. 13, the operation unit 140 is a push-button type switch that is mounted on a side surface of the casing 102 of the smartphone 100. In a case where the operation unit 140 is pressed by the finger or the like, the operation unit 140 enters a switch ON state. In a case where the finger is released, the operation unit 140 enters a switch OFF state by a restoring force of a spring or the like.

The storage unit 150 stores a control program and control data of the main control unit 101, address data in which a name, a telephone number, and the like of a communication counterpart are associated, data of transmitted and received electronic mails, web data downloaded by web browsing, downloaded contents data, and the like and also temporarily stores streaming data and the like.

In addition, the storage unit 150 is composed of an internal storage unit 151 incorporated in the smartphone and an external storage unit 152 including an attachable and detachable external memory slot. Each of the internal storage unit 151 and the external storage unit 152 constituting the storage unit 150 is implemented using a storage medium such as a memory of a flash memory type, a hard disk type, a multimedia card micro type, or a card type, a random access memory (RAM), or a read only memory (ROM).

The external input-output unit 160 acts as an interface for all external apparatuses connected to the smartphone 100 and is directly or indirectly connected to other external apparatuses by communication and the like (for example, Universal Serial Bus (USB) and IEEE 1394) or networks (for example, a wireless local area network (LAN), Bluetooth (registered trademark), radio frequency identification (RFID), infrared data association (IrDA), Ultra Wideband (UWB) (registered trademark), and ZigBee (registered trademark)).

For example, the external apparatuses connected to the smartphone 100 include a wired/wireless headset, a wired/wireless external charger, a wired/wireless data port, a memory card or a subscriber identity module (SIM)/user identity module (UIM) card connected through a card socket, an external audio and video apparatus connected through an audio and video input/output (I/O), an external audio and video apparatus connected in a wired/wireless manner, a smartphone, a personal computer, a personal digital assistant (PDA), and an earphone. The external input-output unit 160 may be configured to deliver data transferred from the external apparatuses to each constituent inside the smartphone 100 or transfer data inside the smartphone 100 to the external apparatuses.

The GPS reception unit 170 receives GPS signals transmitted from GPS satellites ST1, ST2 to STn, executes a position measurement calculation process based on the plurality of received GPS signals, and obtains positional information (GPS information) specified by the latitude, the longitude, and the altitude of the smartphone 100 in accordance with an instruction from the main control unit 101. In a case where the positional information can be obtained from the wireless communication unit 110 and/or the external input-output unit 160 (for example, a wireless LAN), the GPS reception unit 170 can detect the position using the positional information.

The motion sensor unit 180 comprises, for example, a 3-axis acceleration sensor and detects a physical motion of the smartphone 100 in accordance with an instruction from the main control unit 101. By detecting the physical motion of the smartphone 100, the movement direction and the acceleration of the smartphone 100 are detected. The result of the detection is output to the main control unit 101.

The power supply unit 190 supplies power stored in a battery (not illustrated) to each unit of the smartphone 100 in accordance with an instruction from the main control unit 101.

The main control unit 101 comprises a microprocessor, operates in accordance with the control program and the control data stored in the storage unit 150, and manages and controls each unit of the smartphone 100. In addition, the main control unit 101 comprises a mobile communication control function of controlling each unit of a communication system and an application processing function in order to perform voice communication and data communication through the wireless communication unit 110.

The application processing function is implemented by operating the main control unit 101 in accordance with application software stored in the storage unit 150. For example, the application processing function includes an infrared communication function of performing data communication with an opposing apparatus by controlling the external input-output unit 160, an electronic mail function of transmitting and receiving electronic mails, and a web browsing function of browsing web pages, and also includes an image processing function according to the embodiment of the present invention.

In addition, the main control unit 101 comprises the image processing function such as displaying a video on the display and input unit 120 based on image data (data of a still image or a motion image) such as reception data and downloaded streaming data. In addition, the image processing function includes image processing performed by the image processing unit 24 illustrated in FIG. 3.

Furthermore, the main control unit 101 executes display control of the display panel 121 and operation detection control for detecting the user operation performed through the operation unit 140 or the operation panel 122.

By executing the display control, the main control unit 101 displays an icon for starting the application software or a software key such as a scroll bar, or displays a window for composing an electronic mail. The scroll bar refers to a software key for receiving an instruction to move a display part of an image for a large image or the like not accommodated in the display region of the display panel 121.

In addition, by executing the operation detection control, the main control unit 101 detects the user operation performed through the operation unit 140, receives an operation performed on the icon through the operation panel 122 or an input of a text string in an input field of the window, or receives a request for scrolling the display image through the scroll bar.

Furthermore, by executing the operation detection control, the main control unit 101 comprises a touch panel control function of determining whether the operation position on the operation panel 122 corresponds to the overlapping part (display region) in overlap with the display panel 121 or the other peripheral part (non-display region) not in overlap with the display panel 121 and controlling the sensitive region of the operation panel 122 and the display position of the software key.

In addition, the main control unit 101 can detect a gesture operation performed on the operation panel 122 and execute a present function depending on the detected gesture operation. The gesture operation is not a simple touch operation in the related art and means an operation of drawing a trajectory by the finger or the like, specifying a plurality of positions at the same time, or an operation of a combination thereof by drawing a trajectory from at least one of the plurality of positions.

The camera unit 141 converts the image data obtained by imaging into compressed image data in, for example, Joint Photographic Experts Group (JPEG) and records the image data in the storage unit 150 or outputs the image data through the external input-output unit 160 or the wireless communication unit 110 under control of the main control unit 101. As illustrated in FIG. 13, in the smartphone 100, the camera unit 141 is mounted on the same surface as the display and input unit 120. However, the mounting position of the camera unit 141 is not for limitation purposes, and the camera unit 141 may not be mounted on the side surface of the casing 102 on which the display and input unit 120 is disposed. The camera unit 141 may be mounted on the rear surface of the casing 102, or a plurality of camera units 141 may be mounted on the casing 102. In a case where the plurality of camera units 141 are mounted, imaging may be performed by a single camera unit 141 by switching the camera unit 141 performing the imaging, or imaging may be performed using the plurality of camera units 141 at the same time.

In addition, the camera unit 141 can be used in various functions of the smartphone 100. For example, the image obtained by the camera unit 141 may be displayed on the display panel 121, or the image captured and obtained in the camera unit 141 may be used as one of operation input methods for the operation panel 122. In addition, in the detection of the position by the GPS reception unit 170, the position may be detected with reference to the image from the camera unit 141. Furthermore, with reference to the image from the camera unit 141, a determination of the optical axis direction of the camera unit 141 of the smartphone 100 and a determination of the current usage environment can be performed without using the 3-axis acceleration sensor or along with the 3-axis acceleration sensor. The image from the camera unit 141 can also be used in the application software.

Besides, data obtained by adding the positional information obtained by the GPS reception unit 170, voice information (may be text information obtained by performing voice-to-text conversion by the main control unit or the like) obtained by the microphone 132, attitude information obtained by the motion sensor unit 180, and the like to the image data of the still picture or the motion picture can be recorded in the storage unit 150 or output through the external input-output unit 160 or the wireless communication unit 110.

OTHERS

In the imaging element of the present embodiment, while the G filter is arranged in the phase difference detection pixel, the phase difference detection pixel may be configured such that light in a wider wavelength range than the transmission wavelength range of the G filter can be incident on the phase difference detection pixel. For example, a transparent filter can be used without disposing the G filter in the phase difference detection pixel. Accordingly, a high pixel value can be obtained from even the phase difference detection pixel having a smaller opening portion than the normal pixel (the phase difference detection pixel can have high sensitivity).

In addition, in any of the first embodiment of the imaging element illustrated in FIG. 4 and the second embodiment of the imaging element illustrated in FIG. 10, the phase difference pixel row is configured by periodically arranging three pixels including the pair of the first phase difference pixel ZA and the second phase difference pixel ZB and one normal pixel as one cycle. However, the phase difference pixel row is not for limitation purposes. For example, the phase difference pixel row may be configured by periodically arranging five pixels including the pair of the first phase difference pixel ZA and the second phase difference pixel ZB and three normal pixels. In this case, in a case where the normal pixels of the phase difference pixel row are read at a horizontal thinning-out rate of ⅕, the same color arrangement as the normal pixel row corresponding to the phase difference pixel row is achieved.

Furthermore, the present invention is not limited to the above embodiments, and various modifications can be made without departing from the spirit of the present invention.

EXPLANATION OF REFERENCES

1: strobe
2: shutter button
3: power supply/mode switch
4: mode dial
5: zoom button
5T: tele button
5W: wide button
6: cross button
7: MENU/OK button
8: playback button
9: BACK button
10: imaging apparatus
12: imaging lens
14: stop
15: mechanical shutter
16: imaging element
16A, 16B: light shielding member
22: image input controller
24: image processing unit
26: compression/expansion processing unit
28: video encoder
30: liquid crystal monitor
32: sensor drive unit
33: shutter drive unit
34: stop drive unit
36: lens drive unit
38: operation unit
40: CPU
42: AF processing unit
44: AE detection unit
47: ROM
48: memory
50: VRAM
52: media controller
54: memory card
60: interpolation processing unit
62: gain interpolation unit
64: average value interpolation unit
66: signal gradient calculation unit
68: pixel value addition unit
69: final pixel value decision unit
100: smartphone
101: main control unit
102: casing
110: wireless communication unit
120: display and input unit
121: display panel
122: operation panel
130: call unit
131: speaker
132: microphone
140: operation unit
141: camera unit
150: storage unit
151: internal storage unit
152: external storage unit
160: external input-output unit
170: GPS reception unit
180: motion sensor unit
190: power supply unit
CF: color filter
L: microlens
P: basic arrangement pattern
PD: photodiode
ST1: GPS satellite
ST2: GPS satellite
ZA: first phase difference pixel
ZB: second phase difference pixel

What is claimed is:

1. An imaging apparatus comprising:
an imaging element in which a plurality of phase difference detection pixels and a plurality of normal pixels for imaging are two-dimensionally arranged in a first direction and a second direction orthogonal to the first direction; the phase difference detection pixel includes a first phase difference pixel and a second phase difference pixel including opening portions for pupil separation at different positions in the first direction, and the first phase difference pixel and the second phase difference pixel are adjacently arranged to have the opening portions facing each other; in the plurality of normal pixels, a first filter corresponding to a first color most contributing to obtaining a brightness signal and a plurality of second filters respectively corresponding to two or more colors other than the first color are arranged in a first periodic color arrangement; the imaging element includes a normal pixel row in which only the normal pixels are arranged in the first direction and a phase difference pixel row in which the first phase difference pixel, the second phase difference pixel, and the normal pixels are periodically arranged in the first direction; only the normal pixel row is arranged in at least two rows adjacent to the phase difference pixel row; and, in a case where only the normal pixels extending in the second direction are extracted from a plurality of positions at which the normal pixels are arranged in the phase difference pixel row, a color filter is arranged in the plurality of extracted normal pixels in a periodic color arrangement which is the same as the first periodic color arrangement;

an imaging optical system forming a subject image on a light-receiving surface of the imaging element;

a mode dial that switches between a first mode for generating a first image and a second mode for generating a second image; and a processor configured to;

detect a phase difference between a first pixel value obtained from the first phase difference pixel and a second pixel value obtained from the second phase difference pixel of the phase difference pixel row of the imaging element;

control the imaging optical system based on the phase difference;

generate pixel values at pixel positions of the first phase difference pixel and the second phase difference pixel of the phase difference pixel row based on at least a pixel value of the normal pixel of the phase difference pixel row and pixel values of the normal pixels of at least two normal pixel rows adjacent to the phase difference pixel row and generate the first image including the pixel values at the pixel positions of the first phase difference pixel and the second phase difference pixel in a case where the mode dial switches to the first mode; and extract the normal pixels extending in the second direction from positions at which the normal pixels are arranged in the phase difference pixel row, and generate the second image composed of the plurality of extracted normal pixels in a case where the mode dial switches to the second mode.

2. The imaging apparatus according to claim 1, wherein in a case where the first phase difference pixel and the second phase difference pixel are set as an in-focus pixel, the the processor is further configured to generate a pixel value at a pixel position of the in-focus pixel using a pixel value of a surrounding pixel of the pixel position of the in-focus pixel.

3. The imaging apparatus according to claim 2, wherein the processor is further configured to:

calculate a signal gradient direction in which a signal gradient of the surrounding pixel of the pixel position of the in-focus pixel is the minimum in a case of setting the first phase difference pixel and the second phase difference pixel as the in-focus pixel and generating the pixel value at the pixel position of the in-focus pixel, and detect a plurality of pixels present in the signal gradient direction with the pixel position of the in-focus pixel as a reference and having the same color as a color at the pixel position of the in-focus pixel and generate the pixel value at the pixel position of the in-focus pixel by interpolating pixel values of the plurality of detected pixels.

4. The imaging apparatus according to claim 3, wherein the processor is further configured to calculate one of four directions including the first direction, the second direction and a third direction and a fourth direction between the first direction and the second direction as the signal gradient direction.

5. The imaging apparatus according to claim 3, wherein the processor is further configured to calculate one of eight directions including four directions of the first direction, the second direction and a third direction and a fourth direction between the first direction and the second direction and four directions midway among the four directions as the signal gradient direction.

6. The imaging apparatus according to claim 3, wherein in a case where the signal gradient direction is not calculated, the processor is further configured to generate the pixel value at the pixel position of the in-focus pixel based on a pixel value of a pixel closest to the pixel position of the in-focus pixel and having the same color as a color at the pixel position of the in-focus pixel, or pixel values of a plurality of pixels having the same color in an interpolation range with the pixel position of the in-focus pixel as a reference.

7. The imaging apparatus according to claim 3, wherein in each of the first phase difference pixel and the second phase difference pixel, the first filter is arranged, or light in a wavelength range wider than a transmission wavelength range of the first filter is incident, and the processor is further configured to:

add pixel values of the first phase difference pixel and the second phase difference pixel adjacently arranged to have the opening portions facing each other and generate an addition pixel value at a pixel position between the first phase difference pixel and the second phase difference pixel, and use the addition pixel value as the pixel value of one of the surrounding pixels.

8. The imaging apparatus according to claim 3, wherein the processor is further configured to:

set the first phase difference pixel or the second phase difference pixel as the in-focus pixel and obtain gain interpolation information set for the pixel position of the in-focus pixel, and generate the pixel value at the pixel position of the in-focus pixel by gain interpolation based on a pixel value of the in-focus pixel and the gain interpolation information.

9. The imaging apparatus according to claim 1, wherein the first periodic color arrangement is the Bayer arrangement, and the phase difference pixel row is periodically arranged with three pixels including a pair of the first phase difference pixel and the second phase difference pixel and one normal pixel as one cycle.

10. The imaging apparatus according to claim 1, wherein the first filter is a G filter transmitting light in a wavelength range of green, and the plurality of second filters include an R filter transmitting light in a wavelength range of red and a B filter transmitting light in a wavelength range of blue, the first periodic color arrangement has a basic arrangement pattern of 4×4 pixels adjacently arranged in the first direction and the second direction, in the basic arrangement pattern, 2×2 pixels including the G filter and 2×2 pixels including the R filter are adjacently arranged in the first direction, and 2×2 pixels including the B filter and 2×2 pixels including the G filter are adjacently arranged in the first direction, and the phase difference pixel row is periodically arranged with three pixels including a pair of the first phase difference pixel and the second phase difference pixel and one normal pixel as one cycle.

11. The imaging apparatus according to claim 1,
wherein in each of the first phase difference pixel and the
second phase difference pixel of the phase difference
pixel row, the first filter is arranged, or light in a
wavelength range wider than a transmission wavelength range of the first filter is incident.

\* \* \* \* \*